US006772160B2

(12) United States Patent
Cho et al.

(10) Patent No.: US 6,772,160 B2
(45) Date of Patent: Aug. 3, 2004

(54) TECHNIQUES FOR FACILITATING INFORMATION ACQUISITION AND STORAGE

(75) Inventors: Raymond J. Cho, Sunnyvale, CA (US); Richard O. Chen, Mountain View, CA (US); Ramon M. Felciano, San Carlos, CA (US); Daniel R. Richards, Palo Alto, CA (US); Philippa Norman, Los Altos, CA (US)

(73) Assignee: Ingenuity Systems, Inc., Mountain View, CA (US)

( * ) Notice: Subject to any disclaimer, the term of this patent is extended or adjusted under 35 U.S.C. 154(b) by 463 days.

(21) Appl. No.: 09/733,495

(22) Filed: Dec. 8, 2000

(65) Prior Publication Data

US 2003/0014383 A1 Jan. 16, 2003

Related U.S. Application Data

(60) Provisional application No. 60/229,582, filed on Aug. 31, 2000, provisional application No. 60/229,581, filed on Aug. 31, 2000, provisional application No. 60/229,424, filed on Aug. 31, 2000, provisional application No. 60/229,392, filed on Aug. 31, 2000, and provisional application No. 60/210,898, filed on Jun. 8, 2000.

(51) Int. Cl.[7] .......................................... G06F 17/30
(52) U.S. Cl. ............................... 707/10; 707/3; 707/6; 707/102; 709/203; 709/219; 706/50; 706/61; 702/19; 702/82
(58) Field of Search ........................... 707/3, 5, 6, 7, 707/104.1, 10, 102; 702/10, 19, 20–22, 81, 82, 50, 61; 705/2–3; 709/203, 219

(56) References Cited

U.S. PATENT DOCUMENTS

| 5,371,807 A | 12/1994 | Register et al. ............. 382/159 |
|---|---|---|
| 5,377,103 A | 12/1994 | Lamberti et al. ................ 704/9 |
| 5,625,721 A | * 4/1997 | Lopresti et al. .............. 382/309 |
| 5,794,050 A | 8/1998 | Dahlgren et al. ............ 717/144 |
| 5,963,966 A | * 10/1999 | Mitchell et al. ............. 715/513 |
| 6,023,659 A | 2/2000 | Seilhamer et al. ............. 702/19 |
| 6,038,560 A | 3/2000 | Wical ............................ 707/5 |
| 6,052,714 A | * 4/2000 | Miike et al. ................. 709/217 |
| 6,067,548 A | * 5/2000 | Cheng .................... 707/103 R |
| 6,101,488 A | 8/2000 | Hayashi et al. ................ 706/45 |

(List continued on next page.)

OTHER PUBLICATIONS

Newswire Association inc., On–line Tests Give Instant Feedback on Office Skills, Feb. 14, 1998.*

(List continued on next page.)

*Primary Examiner*—Jean R. Homere
*Assistant Examiner*—Leslie Wong
(74) *Attorney, Agent, or Firm*—Wilson Sonsini Goodrich and Rosati

(57) ABSTRACT

The method and system for extracting information from a plurality of articles and for storing the extracted information in a knowledge-based information store. The method and system identify a plurality of articles from which information is to be extracted. The method and system identify and assign a plurality of information extractors for extracting information from the plurality of articles. The method and system receive information extracted by an information extractor from an article assigned to the information extractor. The method and system enable a content reviewer to review the extracted information received from the information extractor and the content reviewer identifies errors associated with the extracted information. If the error count is above the threshold level, the article may be reassigned for information extraction. If the error count is equal to or below the threshold level, the content reviewer may change the extracted information to correct the errors.

68 Claims, 11 Drawing Sheets

U.S. PATENT DOCUMENTS

| | | | | |
|---|---|---|---|---|
| 6,154,737 | A | 11/2000 | Inaba et al. | 707/3 |
| 6,236,987 | B1 | 5/2001 | Horowitz et al. | 707/3 |
| 6,292,796 | B1 * | 9/2001 | Drucker et al. | 707/5 |
| 6,308,170 | B1 * | 10/2001 | Balaban | 707/3 |
| 6,424,980 | B1 * | 7/2002 | Iizuka et al. | 715/513 |
| 6,470,277 | B1 * | 10/2002 | Chin et al. | 702/19 |
| 6,498,795 | B1 * | 12/2002 | Zhang et al. | 370/400 |
| 2002/0165737 | A1 * | 11/2002 | Mahran | 705/3 |

OTHER PUBLICATIONS

Bussiness Week, Saturn: GM finally has a real winner. But success is bringing a fresh batch of problems, Aug. 17, 1992, McGraw–Hill Co. Inc., p. 86, No. 3279.*

Blaschke et al., "Automatic extraction of biological information from scientific text: protein–protein interactions," *American Association for Artificial Intelligence, 1999.*

Karp et al., "HinCyc: A Knowledge Base of the Complete Genome and Metabolic Pathways of *H. influenzae*," Mar. 30, 2000.

Chaudhri et al., "OKBC: A Programmatic Foundation for Knowledge Base Interoperability," 1998.

Rindflesch et al., "Extracting Molecular Binding Relationships from Biomedical Text," presented May 2, 2000 at the *Sixth Applied Natural Language Processing Conference* from Apr. 29, 2000–May 4, 2000 in Seattle, Washington.

Hafner, "Ontological Foundations for Biology Knowledge Models," *4th International Conference. on Intelligent Systems for Molecular Biology, Jun. 12–15, 1996 at Washington University in St. Louis, Missouri.*

Sekimizu et al., "Identifying the Interaction Between Genes and Gene Products Based on Frequently Seen Verbs in Medline Abstracts," presented at the *Genome Informatics Workshop 1998*, Dec. 10–11, 1998, Yebisu Garden Place, Tokyo, Japan.

Thomas et al., "Automatic Extraction of Protein Interactions from Scientific Abstracts," presented at the *Pacific Symposium on Biocomputing*, Jan. 4–9, 2000.

* cited by examiner

TECHNIQUES FOR FACILITATING INFORMATION ACQUISITION AND STORAGE

CROSS-REFERENCES TO RELATED APPLICATIONS

This application claims priority from the following U.S. Provisional Patent Applications, the entire contents of which are herein incorporated by reference for all purposes:

(1) U.S. Provisional Patent Application No. 60/210,898, entitled "SYSTEM FOR REPRESENTING AND MINING BIOLOGICAL DATA" filed Jun. 8, 2000;

(2) U.S. Provisional Patent Application No. 60/229,582, entitled "TECHNIQUES AND PROCEDURES FOR EXTRACTING AND STORING INFORMATION" filed Aug. 31, 2000;

(3) U.S. Provisional Patent Application No. 60/229,581, entitled "INFORMATION/KNOWLEDGE ACQUISITION AND STORAGE TECHNIQUES" filed Aug. 31, 2000;

(4) U.S. Provisional Patent Application No. 60/229,424, entitled "KNOWLEDGE REPRESENTATION SYSTEM" filed Aug. 31, 2000; and (5) U.S. Provisional Patent Application No. 60/229,392, entitled "TECHNIQUES FOR STORING INFORMATION ACCORDING TO A KNOWLEDGE MODEL" filed Aug. 31, 2000.

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the U.S. Patent and Trademark Office patent file or records, but otherwise reserves all copyright rights whatsoever.

BACKGROUND OF THE INVENTION

The present invention relates to the field of information extraction and storage and more specifically to techniques for managing a distributed information acquisition and information storage process.

There has been and will continue to be an explosion in the volume and complexity of information available to information consumers. However, due to the magnitude of disparate information available in the public domain, information consumers are typically able to access, comprehend, and meaningfully use only a very small percentage of the available information. This is primarily because the information is typically buried in articles which may be contained in magazines, journals, papers, newspapers, books, notebooks, etc. or is stored in digital format in information stores such as databases, digital libraries, etc. Unless otherwise stated, the term "article" as used in this application should be construed to include any transcribed or printed information, or information available in digital format, or combinations or portions thereof. The information in an article may include text, graphics, charts, audio information, video information, multimedia information, and other types of information in various formats. An article may be published or unpublished. Since these articles could number in the hundreds and thousands, they cannot all be accessed, read, and understood by an information consumer in a practical timeframe. While several data warehousing techniques have been used to integrate information from various articles, these techniques are not flexible enough to keep up with the proliferation of available information. They also rarely help with the information overload problem. In fact, by aggregating data, these data warehousing techniques often make the information overload problem worse.

One field that has seen a tremendous explosion of information in the past decade is the life sciences field which has benefited from the exponential growth in the identification and functional characterization of genes in the biological sciences. A decade ago a laboratory notebook was often sufficient for "data warehousing." A researcher could rely on his or her deep understanding of a handful of genes to make informed decisions regarding his or her research. Today, the influx of information and the blurring of traditional biological research boundaries have outstripped the ability of a researcher to fully assimilate, synthesize, and evaluate research data. The primary impediment for a researcher is not the lack of information; rather it is the large quantity and unstructured format used to store the information. To evaluate results of large-scale experiments, researchers rely heavily on published research literature to identify the key information that is critical for them to make informed decisions. The vast number of articles, the unstructured format of the information, and the inability of the researchers to query on specific experimental results dictates that the review of the literature may take several days, weeks, or even more of a researcher's time. In addition to being very time intensive, the accumulation of knowledge by the researcher is not easily transferable to other researchers because it is not in an easily accessible format.

Based on the above, there is a need for techniques which can extract information from the various sources and store it in a format which can be easily accessed or queried by an information consumer. It is also desirable that the techniques be flexible enough to keep pace with the proliferation of information. Further, it is also desirable that the techniques be adaptable to extract and store information related to various domains and fields.

SUMMARY OF THE INVENTION

The present invention discusses techniques for extracting information from a plurality of articles and for storing the extracted information in an information store. According to an embodiment, the present invention identifies a plurality of articles from which information is to be extracted. The present invention also identifies a plurality of information extractors for extracting information from the plurality of articles. A database is provided for storing information related to the plurality of articles and the plurality of information extractors. According to this embodiment, the present invention assigns the plurality of articles to the plurality of information extractors for information extraction. The present invention receives information extracted by an information extractor from an article assigned to the information extractor. The extracted information is then stored in the information store.

According to an embodiment of the present invention, the information store is a knowledge base which is configured to store the extracted information according to an ontology. In this embodiment, information may be extracted from articles using a fact-based model.

According to another embodiment, the present invention enables quality control processing to be performed on the information extracted by the information extractor before the extracted information is stored in the information store. According to this embodiment, the present invention enables a content reviewer to review the extracted information received from the information extractor. The present invention may receive information from the content reviewer identifying errors associated with the extracted information.

According to an embodiment, the present invention determines, from the information received from the content reviewer, an error count indicating number of errors in the extracted information received from the information extractor. If the error count is above a threshold error count level, the article may be reassigned to the information extractor for information extraction. If the error count is equal to or below the threshold error level, the present invention may provide services enabling the content reviewer to change the extracted information received from the information extractor to correct the errors.

According to another embodiment, the present invention calculates the compensation due to information extractors for extracting information from the articles. The compensation amount for an information extractor may be calculated based on several criteria such as the number of errors in the information extracted by the information extractor, a quality score assigned to the article, and other metrics information captured during quality control processing.

According to yet another embodiment, the information store is configured to store the extracted information according to an information model. In this embodiment, the present invention allows reviewers to review the extracted information and make changes, if any, to the information model to accommodate the extracted information. In this embodiment, the present invention may allow a reviewer to review the extracted information and new concepts introduced by the extracted information and to provide information identifying changes, if any, to be made to the information model. According to a specific embodiment, the information provided by the reviewer may then be reviewed by a second reviewer. After the second reviewer has approved of the changes, the information model may be changed. In a specific embodiment, the information store is a knowledge base which is configured to store the extracted information according to an ontology. The present invention provides services enabling ontologists to review new concepts and to make changes to the ontology to accommodate the new concepts. Other information models may also be used in conjunction with the present invention.

Further understanding of the nature and advantages of the present invention may be realized by reference to the remaining portions of the specification and the attached drawings.

DESCRIPTION OF THE SPECIFIC EMBODIMENTS

Figure 1:
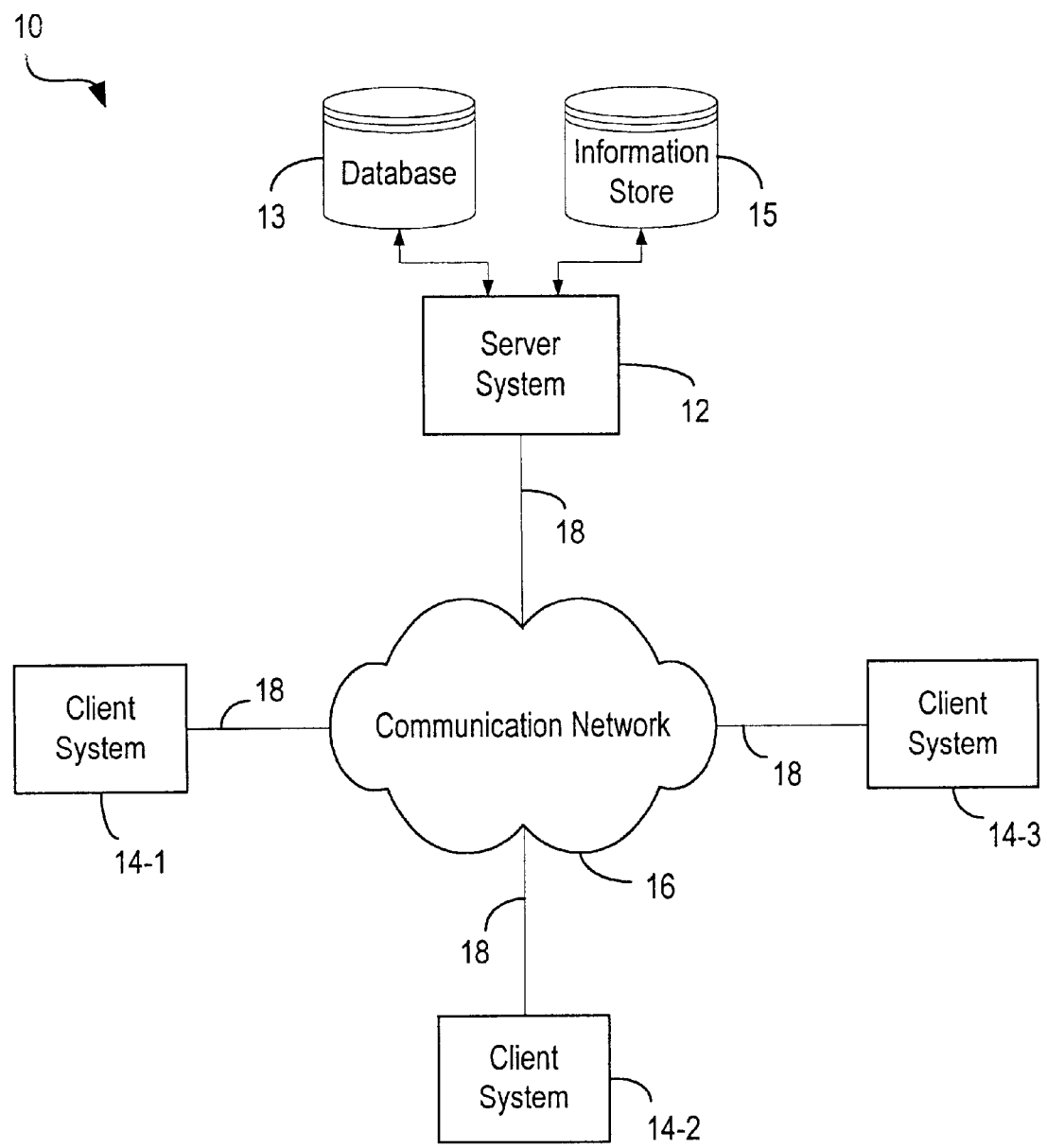
FIG. 1 is a simplified block diagram of a distributed computer network which may incorporate an embodiment of the present invention.

The present invention provides techniques for extracting information or knowledge from a plurality of articles in a distributed manner and for storing the extracted information or knowledge in a structured format which can be accessed or queried by information consumers. Techniques are discussed for managing the process of information extraction and storage. FIG. 1 is a simplified block diagram of a distributed computer network 10 which may incorporate an embodiment of the present invention. Computer network 10 includes a number of computer systems 12, 14-1, 14-2, and 14-3 coupled to a communication network 16 via a plurality of communication links 18. The computer systems include a plurality of client computer systems 14-1, 14-2, and 14-3, and a server computer system 12. Client systems 14 typically request information from a server computer system, which performs processing in response to the client request and provides the requested information to the client systems. For this reason, servers typically have more computing and storage capacity than client systems. However, a particular computer system may act both as a client or a server depending on whether the computer system is requesting or providing information.

Communication network 16 provides a mechanism for allowing the various components of distributed network 10 to communicate and exchange information with each other. Communication network 16 may itself be comprised of many interconnected computer systems and communication links. Communication links 18 may be hardwire links, optical links, satellite or other wireless communications links, wave propagation links, or any other mechanisms for communication of information. While in one embodiment, communication network 16 is the Internet, in other embodiments, communication network 16 may be any suitable computer network. Distributed computer network 10 depicted in FIG. 1 is merely illustrative of an embodiment incorporating the present invention and does not limit the scope of the invention as recited in the claims. One of ordinary skill in the art would recognize other variations, modifications, and alternatives. For example, more than one server system 12 may be coupled to communication network 16.

According to the teachings of the present invention, server system 12 is responsible for receiving information extracted from the various articles, for processing the information, and storing it in a format which allows information consumers to query or access the information. The term "server system" as used in this application may refer to a single server system as depicted in FIG. 1, or may refer to one or more server systems distributed within computer network 10. Accordingly, functions or tasks performed by the present invention may be distributed to one or more servers coupled to communication network 16. According to a specific embodiment, the servers may be isolated behind firewalls for security purposes and communication between the servers may be encoded and encrypted.

According to an embodiment of the present invention, the extracted information may be stored in an information store 15 coupled to server 12. The information store may be a database, a knowledge base, file server, or any other type of storage mechanism. The term "information store" as used in this application may refer to a single information store or to a plurality of information stores distributed within computer network 10. For example, information store 15 may be locally coupled to server 12 or may be distributed across distributed computer network 10 and accessed by server 12 via communication network 16.

In a specific embodiment of the present invention, information store 15 is a knowledge base configured to store information according to an ontology. An ontology is a knowledge representation of the real world or some portion of the real world. An ontology is typically comprised of "individuals" which represent single things or elements, "classes" which represent a group of things that share similar properties, "slots" which represent relationships between the things, "facets" which represent detailed information about the slots, "relations" which represent aforementioned things, and other information. Relations may include but are not limited to taxonomic relationships and partonomic relationships. An ontology may comprise a plurality of branches based on these relationships.

Server system 12 may be configured to perform a plurality of functions according to the teachings of the present invention. These functions are typically performed by software code modules executing on server system 12. The functions may also be performed by hardware modules coupled to server system 12, or by a combination of software and hardware modules. Functions performed by server 12 include facilitating identification of articles from which information is to be extracted, determining information extractors who will be responsible for extracting the information from the articles, certifying the information extractors in techniques of information extraction, assigning articles to the information extractors for information extraction, receiving information extracted by the information extractors from the articles, facilitating performance of quality control activities to ensure the correctness and accuracy of the extracted information, enabling users to change the model for storing the information, storing information in information store 15, and performing other functions according to the teachings of the present invention. Details related to the various functions performed by server system 12 are described below.

As shown in FIG. 1, a database 13 may be coupled to server 12. Database 13 may be used to store information associated with processing performed by the present invention for extracting information from the articles. The information stored in database 13 may also be used to keep track of the various steps of the information extraction and storage process. For example, the status or progress of any particular step of the information acquisition process can be ascertained from the information stored in database 13. Additionally, information related to the various users of the present invention, and the status of the extracted information as it progresses through the process may also be stored in database 12. The users may also be classified into various groups, and roles and permissions may be assigned to the users based on the groups to which the users belong. Information related to the groups and roles and permissions associated with the groups may also be stored in database 13.

The term "database 13" as used in this application may refer to a single database or to a plurality of databases distributed within computer network 10. For example, database 13 be locally coupled to server 12 or may be distributed across computer network 10 and accessed by server 12 via communication network 16. Database 13 may be a relational database, an object-relational database, an object-oriented database, a knowledge base, a flat file, or any other way of storing information. It should be apparent that although FIG. 1 depicts information store 15 and database 13 as two separate entities, in a specific embodiment of the present invention, information store 15 and database 13 may be combined into a single information store or database.

Client systems 14 may be used to interact with server 12. For example, client systems 14 may be used by information extractors to input information extracted from the articles. Client systems 14 may also be used by users to apply to become information extractors. Once a user has been appointed/designated as an information extractor, the user may use client system 14 to participate in certification and testing activities related to the information extraction process which may be offered by server system 12. Client systems 14 may also be used to participate in quality control and information model review activities provided by modules executing on server system 12.

Figure 2:
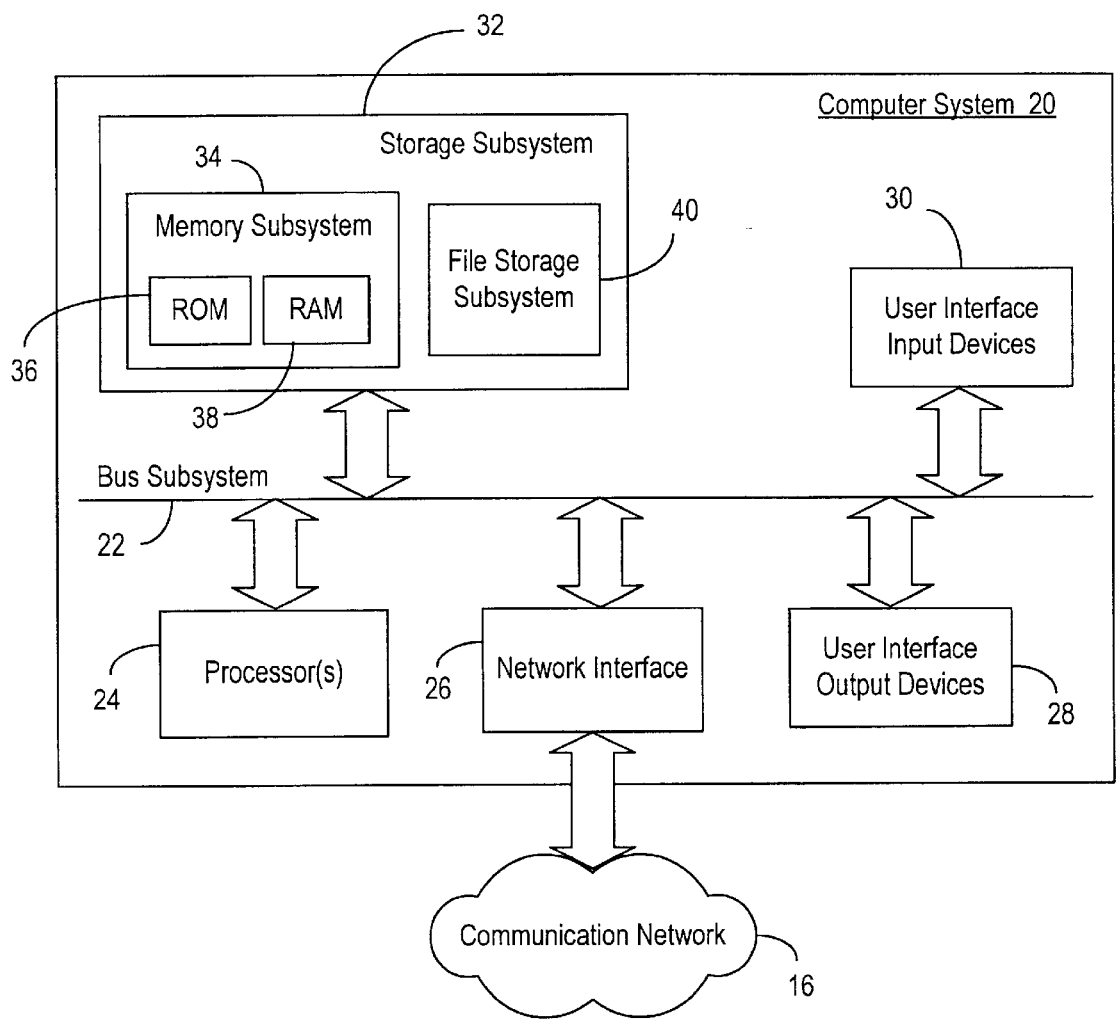
FIG. 2 is a simplified block diagram of a computer system which may incorporate an embodiment of the present invention.

FIG. 2 is a simplified block diagram of an exemplary computer system 20 according to an embodiment of the present invention. Computer system 20 typically includes at least one processor 24, which communicates with a number of peripheral devices via bus subsystem 22. These peripheral devices typically include a storage subsystem 32, comprising a memory subsystem 34 and a file storage subsystem 40, user interface input devices 30, user interface output devices 28, and a network interface subsystem 26. The input and output devices allow user interaction with computer system 20. It should be apparent that the user may be a human user, a device, another computer, and the like. Network interface subsystem 26 provides an interface to outside networks, including an interface to communication network 16, and is coupled via communication network 16 to corresponding interface devices in other computer systems.

User interface input devices 30 may include a keyboard, pointing devices such as a mouse, trackball, touchpad, or graphics tablet, a scanner, a barcode scanner for scanning article barcodes, a touchscreen incorporated into the display, audio input devices such as voice recognition systems, microphones, and other types of input devices. In general, use of the term "input device" is intended to include all possible types of devices and ways to input information into computer system 20 or onto computer network 16.

User interface output devices 28 may include a display subsystem, a printer, a fax machine, or non-visual displays such as audio output devices. The display subsystem may be a cathode ray tube (CRT), a flat-panel device such as a liquid crystal display (LCD), or a projection device. The display subsystem may also provide non-visual display such as via audio output devices. In general, use of the term "output device" is intended to include all possible types of devices and ways to output information from computer system 20 to a human or to another machine or computer system.

Storage subsystem 32 stores the basic programming and data constructs that provide the functionality of the various systems embodying the present invention. For example, the various modules implementing the functionality of the present invention may be stored in storage subsystem 32. These software modules are generally executed by processor (s) 24. In a distributed environment, the software modules may be stored on a plurality of computer systems and executed by processors of the plurality of computer systems. Storage subsystem 32 also provides a repository for storing the various databases storing information according to the present invention. Storage subsystem 32 typically comprises memory subsystem 34 and file storage subsystem 40.

Memory subsystem 34 typically includes a number of memories including a main random access memory (RAM) 38 for storage of instructions and data during program execution and a read only memory (ROM) 36 in which fixed instructions are stored. File storage subsystem 40 provides persistent (non-volatile) storage for program and data files, and may include a hard disk drive, a floppy disk drive along with associated removable media, a Compact Digital Read Only Memory (CD-ROM) drive, an optical drive, removable media cartridges, and other like storage media. One or more of the drives may be located at remote locations on other connected computers at another site on communication network 16. Information stored according to the teachings of the present invention may also be stored by file storage subsystem 40.

Bus subsystem 22 provides a mechanism for letting the various components and subsystems of computer system 20 communicate with each other as intended. The various subsystems and components of computer system 20 need not be at the same physical location but may be distributed at various locations within distributed network 10. Although bus subsystem 22 is shown schematically as a single bus, alternative embodiments of the bus subsystem may utilize multiple busses.

Computer system 20 itself can be of varying types including a personal computer, a portable computer, a workstation, a computer terminal, a network computer, a television, a mainframe, or any other data processing system. Due to the ever-changing nature of computers and networks, the description of computer system 20 depicted in FIG. 2 is intended only as a specific example for purposes of illustrating the preferred embodiment of the present invention. Many other configurations of a computer system are possible having more or less components than the computer system depicted in FIG. 2. Client computer systems 14 and server computer systems 12 generally have the same configuration as shown in FIG. 2, with the server systems generally having more storage capacity and computing power than the client systems.

Figure 3:
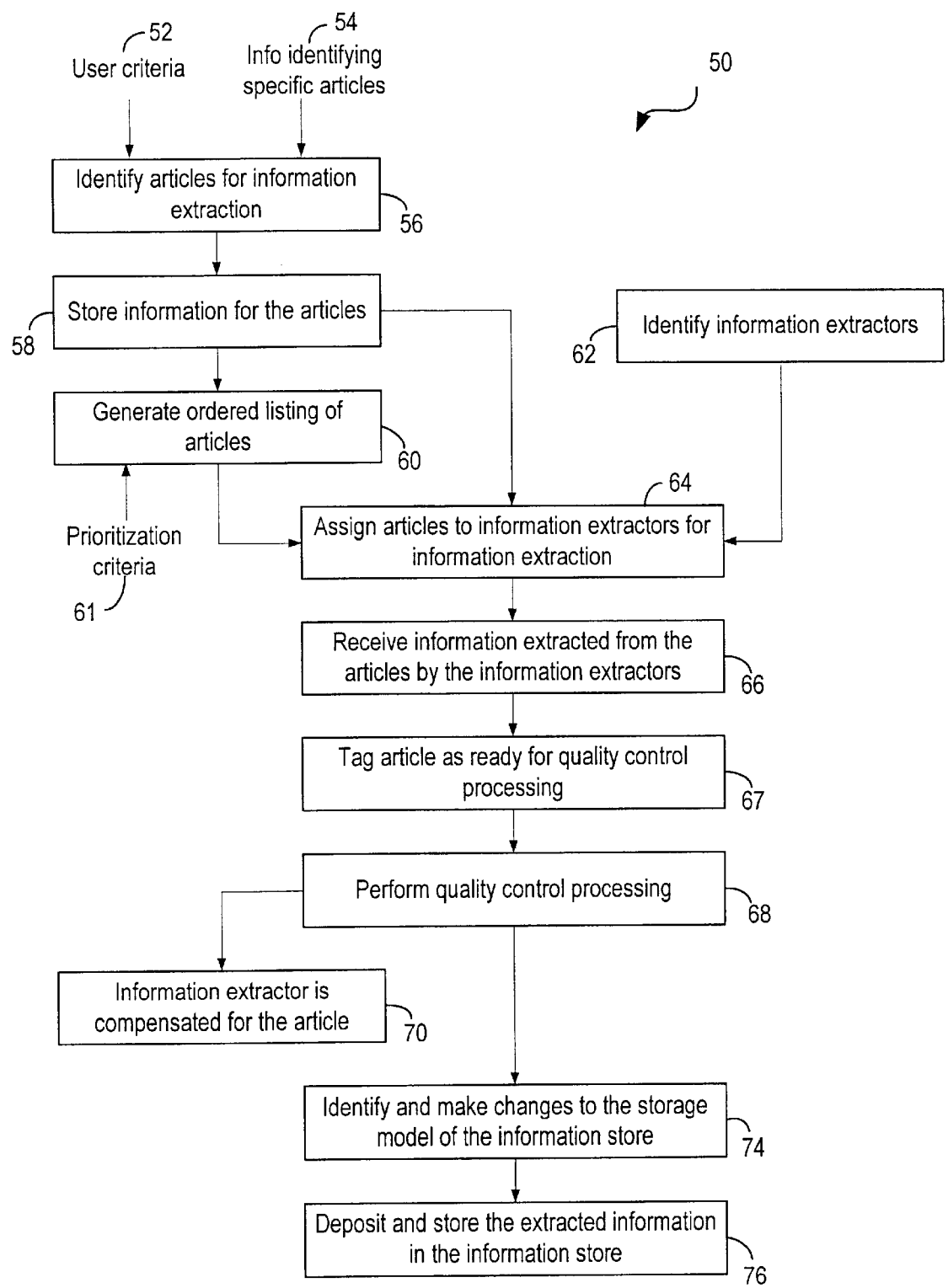
FIG. 3 is a simplified flowchart showing processing performed by an embodiment of the present invention to facilitate information extraction and storage.

FIG. 3 is a simplified flowchart 50 showing processing performed by an embodiment of the present invention to facilitate the information extraction and storage process. As shown in FIG. 3, the process comprises a number of steps or stages. Status information related to each of the stages is maintained by server 12. Modules performing processing according to flowchart 50 are also responsible for controlling the flow and distribution of articles and information through the various stages of flowchart 50. Processing is initiated by identifying the articles from which the information is to be extracted (step 56). As previously indicated, the term "article" as used in this application should be construed to include any transcribed or printed information, or information available in digital format, or combinations or portions thereof. The information in an article may include text, graphics, charts, audio information, video information, multimedia information, and other types of information in various formats. An article may be published or unpublished. Further, the term "information" as used in this application should be construed to include content, data, knowledge, and other types of information which may be extracted from the articles.

Several different techniques may be used to identify the articles. According to a first technique, information 54 identifying the articles from which information is to be extracted may be specifically provided to server 12. According to another technique, user criteria 52, which is to be used by server 12 to search for articles from which information is to be extracted, may be provided to server 12. According to a specific embodiment of the present invention, information 54 and user criteria 52 may be used independently to identify the articles. In alternative embodiments of the present invention, various combinations of information 54 and user criteria 52 may be used to identify the articles.

The user criteria may be used to characterize the type of articles to be found. Users of the present invention may use user criteria 52 to tailor the search performed by server 12 to identify articles related to a particular domain or field or industry. User criteria 52 may include keywords specific to the domain, names of publications, names of journals, newspaper names, databases names, digital libraries, various concepts, names of authors, publication dates, etc. related to the domain, and other like information.

For example, for the life sciences field, user criteria 52 may include keywords such as names of genes, names of array techniques, names of proteins and amino acids, gene sequences, gene expression profiles, drug names, concepts, experimental methods and techniques, names of publications and journals, publication dates, etc. User criteria 52 may also identify publications such as Nature, Cell, Science, Nature Medicine, Nature Genetics, Proceedings of the National Academy of Sciences (PNAS), Journal of Biological Chemistry, European Molecular Biology Organization (EMBO) publications, Journal of Cell Biology, Genes and Development, Molecular and Cellular Biology, etc. to be included in the search. User criteria 52 may also identify databases, including public and private databases (when permitted), to be searched such as the Medline database, the Genbank database, the SwissProt database, the ProSite database, the Interpro database, the LocusLink database, the Unigene database, and various other databases. Various other types of information related to the life sciences domain may also be included in user criteria 52.

User criteria 52 provided to server 12 may be stored in database 13 coupled to server 12. Based upon the user criteria, server 12 searches the various resources coupled to distributed network 10 to identify articles which satisfy and are relevant to the user criteria. As previously stated, the resources which are searched by server 12 may include magazines repositories, journals, research papers, newspapers, books, and other material repositories. The resources may also include online databases, digital libraries, data banks, etc. coupled to communication network 16. Server 12 may use various search techniques to identify articles which are relevant to the user criteria. These techniques may include techniques using natural language processing to perform the search(es), techniques using synonyms and word/phrase expansion, and other like techniques. Further, server 12 may perform a single search or a plurality of searches based upon the user criteria or based on results of previous searches.

The searches performed by server 12 may yield one or more articles. According to a specific embodiment, the articles identified via the searches may be grouped into categories based on the degree of relevancy of the articles to the user criteria. Server 12 may also filter the articles based upon the degree of relevancy of the articles. For example, an article whose degree of relevancy to the user criteria is below a threshold value may be filtered out by server 12 as part of step 56. The threshold value may be user-configurable. In alternative embodiments, a filter based on natural language processing (NLP) may be used to identify articles which are relevant to the user criteria. The user may also indicate that articles from particular sources are not to be considered for information extraction purposes. Server 12 may then automatically filter out articles from these particular sources. The articles may also be categorized based on other criteria such as the source of the articles, publication dates of the articles, author(s) of the articles, etc. The categorization criteria may be configured by the user of the present invention and provided to server 12. For example, the user may indicate that articles from a particular set of journals are to be grouped into one category. It should be apparent that the filtering and categorization techniques are user configurable.

The output of step 56 comprises a filtered or categorized list of articles, which may include articles explicitly identified by the user and/or articles identified via searches performed by server 12. Information related to these articles is stored in database 13 (step 58). For each article, the stored information may include descriptive information about the article such as the title of the article, the author(s) of the article, the source of the article, the publication date of the article, and other like information related to the article. The stored information may also indicate whether the article was specifically identified by the user or identified via a search, information related to the categorization of the article, etc. Information related to articles which are filtered out in step 56 may also be stored in database 13 for reference purposes. Information related to articles which could not be unambiguously categorized in step 56 may also be stored in database 13. This information allows the non-categorized articles to be manually categorized. Information related to the manual categorization of the articles is also stored in database 13. According to a specific embodiment of the present invention, server 12 assigns a unique article identifier to each article. The article identifier allows a user of the present invention to query or track the status of an article during the information extraction and information storage process.

As part of step 58, server 12 also stores (in database 13) access information for each article which enables information extractors to access the article in order to extract information from the article. According to an embodiment, this information may include the title of the article, the author(s) of the articles, the source of the article, etc. An information extractor may then use this information to access the article. According to another embodiment, server 12 may store uniform resource locator (URL) information for the article indicating a web site from which the article may be accessed by an information extractor.

According to yet another embodiment of the present invention, if permitted, server 12 may procure and store digital copies of the articles as part of step 58. In this embodiment, server 12 determines, from the list of articles identified in step 56, articles which are electronically available (i.e. available in digital format), and those which are not. For articles which are electronically available, server 12, if permitted, automatically accesses the digital versions of the articles. Server 12 may determine if access to the articles is permitted on an article-by-article basis. The present invention may be configured to access various types of digital formats such as PDF format, Postscript format, word processor generated formats, text formats, HTML formats, and several other formats. According to an embodiment, server 12, if permitted, makes digital copies of the articles and stores the copies in database 13. In alternative embodiments of the present invention, the digital copies may be stored by other components depicted in FIG. 1, e.g. the copies may be stored on a file server coupled to communication network 16. If the present invention is not permitted to make digital copies of the articles, server 12 may store information related to the articles which allows information extractors to access the articles. For example, as previously stated, server 12 may store a URL corresponding to the article which may be used to display the article, even if the article is stored on a foreign site. For articles which are not available in digital format, copies of the articles may be obtained manually. The manually obtained copies may then be scanned, if permitted, to produce digital versions of the articles. The digital versions may then be stored, for example, in database 13 or on a file server. As previously stated, if the present invention is not permitted to make digital versions of the articles, server 12 may store information related to the articles which allows information extractors to access the articles.

After information for the articles has been stored in database 13, server 12 may set the status of the articles in database 13 to indicate that the articles are now ready for information extraction. According to an embodiment of the present invention, processing then continues with step 64 or step 60.

According to an embodiment of the present invention, the present invention generates an ordered listing (or "queue") of the articles which have been tagged as ready for information extraction (step 60). The position of an article in the queue determines the order in which the article will be presented to an information extractor for information extraction—an article with a higher ranking in the ordered list will be presented for information extraction before an article with a lower ranking. Ordering the articles in this manner ensures that articles which are deemed "more important," and hence assigned a higher priority, will be presented for information extraction before articles which are deemed "less important." This also allows the present invention to make optimal use of information extraction resources. For example, given a finite set of information extractors, the ordered listing ensures that information from the "more important" articles will be extracted before the resources are used to extract information from the "less important" articles. It should be apparent that each article in the queue may be represented by information related to the article, such as a URL corresponding to the article, descriptive information for the article, a digital copy of the article, etc.

The order of an article in the queue is determined by a priority score generated by server 12 and associated with the article. Articles with higher priorities are assigned higher priority score and are thus ranked higher up the ordered list than articles with lower priorities. The priority for each article may be calculated based on characteristics of the article and using user-configurable priority calculation techniques/algorithms. For example, an article may be prioritized based on the categorization of the article in step 56. Articles that are more relevant to the user criteria may be assigned higher priorities than articles with lower degrees of relevancy to the user criteria. Server 12 may also prioritize articles based upon prioritization criteria 61 configured by the user of the present invention and stored in database 13. Prioritization criteria 61 may include information related to the sources of articles, i.e. the journal, magazine, or database containing the article, the date of publication of articles, author(s) of the articles, and other like information. For example, articles from specific journals identified by the user as "more important" journals may be assigned a higher priority score than articles from other sources. Information related to priority scores associated with the articles and the subsequent ranking of the articles in the queue is stored in database 13. The priority score associated with an article may be periodically changed by server 12 if the criteria for prioritization changes or if the algorithm used for calculating the priority changes. The priority score may be recalculated individually for each article or for a whole collection of articles. This change is dynamically reflected in the ordered listing.

According to another embodiment of the present invention, instead of prioritizing the articles into a single queue, server 12 may prioritize the articles into multiple queues corresponding to different subjects or areas of discussion. For example, in the life sciences field, server 12 may generate a queue for articles discussing oncology related topics, a queue for articles discussing cardiovascular diseases related topics, a queue for articles discussing topics related to gene function, and so on. Organizing the articles in this manner facilitates assignment of the articles to information extractors with special expertise in a particular area within the domain. For example, an article from the oncology queue may be assigned to an information extractor with expertise in oncology.

In parallel to identifying the articles, the present invention also performs processing to identify information extractors who will be responsible for extracting the information from the articles (step 62). These information extractors may be human beings who have been selected by users of the present invention to extract information from the articles. In alternative embodiments of the present invention, the information extractors may also be application programs which can be configured to automatically extract information from the articles. The process for facilitating selection of information extractors, according to an embodiment of the present invention, is described below.

Figure 4:
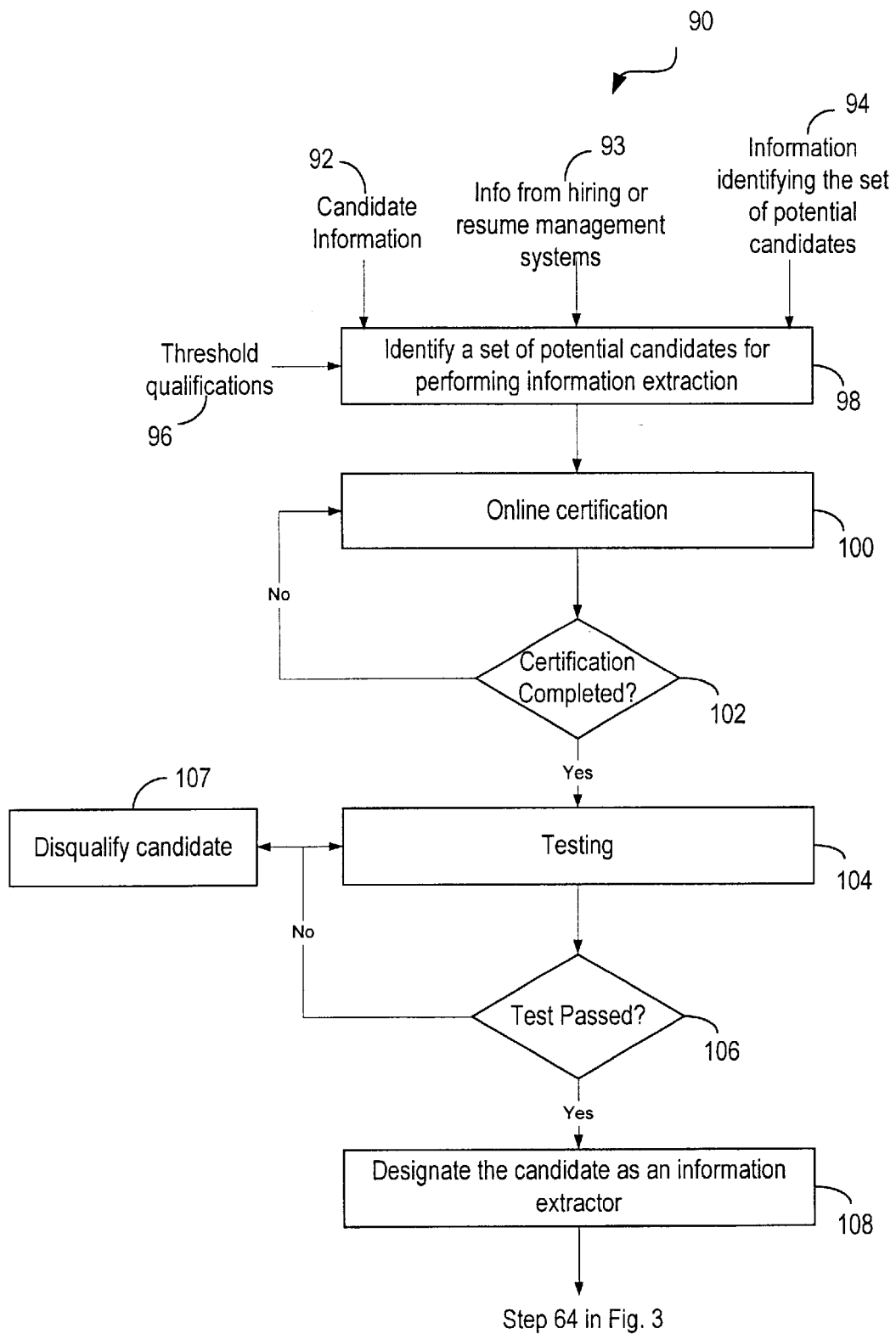
FIG. 4 is a simplified flowchart showing processing performed by an embodiment of the present invention for identifying information extractors.

FIG. 4 is a simplified flowchart 90 showing processing performed by server 12 for facilitating identification of information extractors according to step 62 in FIG. 3. The process is generally initiated when server 12 identifies a set of potential candidates for performing information extraction (step 98). The set of candidates are generally selected from a plurality of candidates who have expressed an interest in becoming information extractors.

The present invention may use several techniques to identify the set of potential candidates. According to a specific embodiment, server 12 may receive information 92 related to candidates who are interested in becoming information extractors. Candidates may provide information 92 to server 12 using client systems 14. In this manner, candidates, irrespective of their geographical locations, can apply to become information extractors. The candidate information may be in the form of a resume or other information about the candidate and may be stored by server 12 in database 13. Server 12 may then be configured to automatically compare the threshold requirements 96 for becoming an information extractor (generally provided by the user of the present invention) with the candidate information to identify a set of candidates whose qualifications equal or exceed the threshold requirements. Several commercial-off-the-shelf (COTS) resume matching products may also be used by the present invention to automatically perform the comparison to identify the set of potential candidates. Threshold qualification information 96 is user configurable.

According to another embodiment, server 12 may utilize services and information provided by a hiring system or a resume management system to identify the potential list of candidates. For example, server 12 may use a resume management system to query databases on the Internet where candidates have deposited resumes and to receive information 93 identifying candidates who satisfy/meet the minimum requirements for becoming information extractors.

In alternative embodiments of the present invention, information identifying the set of potential candidates may be specifically provided to server 12 by users of the present invention.

According to the teachings of the present invention, information related to the set of potential candidates identified in step 98 may be stored in database 13. For example, for each candidate selected in step 98, server 12 stores information related to the candidate in database 13. The stored information may include the name of the candidate, the candidate's contact information, the candidate's academic information, the candidate's work experience, any special expertise of the candidate, and other like information. Server 12 may also assign a unique identifier to each selected candidate to uniquely identify the candidate. The identifier information may be stored in database 13 and may be used to track the status of the candidate. Server 12 may also set access rights for each selected candidate allowing the selected candidate to access online certification modules provided by server 12.

The selected candidates then undergo a certification process to learn about procedures and protocols for extracting information from the articles (step 100). According to an embodiment of the present invention, server 12 provides online certification modules which may be accessed by the selected candidates via client systems 14. The certification process typically explains the protocols/procedures to be followed by each information extractor for extracting information from the articles. Such protocols ensure that information from a plurality of heterogenous articles is extracted in a coherent, standard, and homogenous format. The certification process may also introduce and explain the use of information extraction tools used by the information extractors for extracting information. According to an embodiment of the present invention, as part of the certification process, each candidate is allowed to use software tools which are used by information extractors for extracting information from the articles.

A candidate's progress through the certification process may be tracked by server 12 and stored in database 13. For example, after successful completion of a certification module, information stored in database 13 associated with the candidate may be updated to indicate successful completion of the module by the candidate. In this manner, a candidate's progress through the certification process can be easily tracked.

After server 12 determines that a candidate has successfully completed the certification process (step 102), the candidate is then tagged as being eligible to be tested to determine if the candidate has acquired sufficient skills to qualify as an information extractor. According to an embodiment of the present invention, information stored in database 13 associated with the candidate is updated to indicate that the candidate has successfully completed the certification process and is ready to be tested. Access rights associated with the candidate are updated to allow the candidate to participate in online testing.

Several different testing techniques may be used. According to a first technique, a candidate may be deemed to have passed the test upon successful completion of the certification modules and associated practice exercises. According to another technique, the candidate may be required to take an online test (step 104) provided by server 12, and appointment of the candidate as an information extractor may be contingent on the results of the test. After server 12 determines that a candidate has successfully passed the test (step 106), the candidate is then certified and designated as an information extractor (step 108). If a candidate fails the test, the candidate may be allowed to retake the test (step 104) or may be disqualified from becoming an information extractor (step 107). In alternative embodiments of the present invention, the certification and testing activities may also be performed in an offline environment. However, performing the activities in an online distributed manner allows the present invention to harness the power of communication networks such as the Internet to expand the reach of the information extraction process.

According to an embodiment of the present invention, information stored in database 13 for a candidate is updated to indicate that the candidate has successfully completed the testing process and has been designated as an information extractor. According to an embodiment of the present invention, as part of step 108, the candidate may be asked to enter into contractual agreements with the user of the invention. These contractual agreements may contain terms related to non-disclosure clauses, terms related to the information extractor's compensation, and other terms. In a specific embodiment, the information extractor is paid for extracting information on a per article basis. According to an embodiment of the present invention, the contractual process can be accomplished online using features such as digital signatures, and the like. Information related to the contract signed by the information extractor is stored in database 13. Access rights associated with the candidate are updated to allow the information extractor to gain access to articles marked for information extraction.

Referring back to FIG. 3, after the information extractors have been identified in step 62, the articles tagged for information extraction are then assigned to the information extractors for information extraction (step 64). One or more articles may be assigned to each information extractor for information extraction. An article may also be simultaneously assigned to more than one information extractor. Assigning an article to more than one information extractor enables redundant information acquisition.

Several different techniques may be used for assigning articles to the information extractors. According to an embodiment of the present invention in which the articles which are ready for information extraction are not queued by server 12 (i.e. step 60 is not performed), the articles may be assigned to the information extractors in a pre-configured or random manner. Alternatively, an information extractor may be allowed to select an article for information extraction.

In an embodiment of the present invention in which server 12 prioritizes the articles into a queue, the articles may be assigned to the information extractors in order starting with the first article in the queue. As previously stated, this ensures that articles which are "more important" will be presented for information extraction before articles which are deemed "less important," thus making optimal use of the information extraction resources.

According to another embodiment of the present invention, server 12 may create a queue for each information extractor and the articles from the queue generated in step 60 may be assigned to each information extractor's queue. Server 12 may periodically prioritize the articles in the main queue and in the individual information extractor queues. The information extractors may also be organized into groups with a queue for each group. Articles from the queue generated in step 60 may then be assigned to the group queues.

According to yet another embodiment, server 12 may assign articles based on the expertise of the information extractor. For example, in the embodiment wherein server 12 prioritizes the articles into multiple queues based on the topic of discussion of the articles, server 12 may assign articles to an information extractor from a queue which stores articles related to the field of expertise of the information extractor. For example, articles from the oncology queue may be assigned to an information extractor with expertise in the field of oncology.

The information in database 13 for each assigned article may be updated to indicate that the article has been assigned to an information extractor for information extraction. The information stored in database 13 for each assigned article may comprise information identifying the information extractor to whom the article was assigned, the date when the article was assigned to the information extractor, and other like information. Likewise, information stored in database 13 for an information extractor may also be updated to indicate that articles have been assigned to the information extractor for information extraction. For each information extractor the stored information may indicate the number of articles assigned to the information extractor, information identifying the assigned articles, the dates when the articles were assigned, and other like information.

Server 12 then receives information extracted by the information extractors from articles assigned to the information extractors (step 66). Information extractors may input the extracted information using client systems 14. As previously stated, information extractors may access the articles using information stored in database 13. For example, an information extractor may use URL information for an article to access the article. In another embodiment, the information extractor may use descriptive information related to an article to access a hard copy of the article. In embodiments where database 13 stores digital versions of the articles, an information extractor, when permitted, may access the stored digital version of the article using client system 14. After accessing an article, the information extractor extracts information from the article and inputs the extracted information to server 12. The information may be extracted according to a protocol established by the user of the present invention.

According to an embodiment of the present invention, server 12 may provide user interfaces and services to facilitate entry of the extracted information. These user interfaces and services may be accessed by an information extractor using client system 14. Server 12 may provide several techniques allowing the information extractors to input the extracted information. According to a first technique, the information extractor may enter the extracted information in the form of natural language sentences. According to another technique, server 12 may provide templates for entering the extracted information. According to yet another technique, server 12 may provide features allowing information extractors to input the extracted information via pictures or diagrams, speech, fax, e-mail, or handwriting, or using any combinations of the aforementioned techniques and other techniques. Server 12 may also allow/enable information extractors to input the extracted information using combinations of the aforementioned techniques and other techniques. Server 12 may then process the information entered by the information extractor to determine information to be stored in information store 15.

For example, according to an embodiment of the present invention, information store 15 may be a frame-based knowledge base and the protocol for extracting the information may be based on a fact model. In this embodiment, the extracted information input by an information extractor may comprise one or more facts and information associated with the facts. A fact (or "finding") may refer to a piece of information having a defined structure and which is extracted from the articles according to a protocol/procedure. A fact may be comprised of discrete objects and processes. The discrete objects may represent physical things, temporal things, abstract things, etc. For example, in the life sciences field, the discrete objects may be genes, proteins, cells, organisms, etc. Processes are actions that act on targets which are also discrete objects, or on other processes. The information extractor may also input metadata for each fact. Metadata is generally information that describes the circumstances under which a fact was observed, but may also include information about the source of the information—for example, authors and publication date of an article. An example of a fact is:

"... GST-bax binds to bcl2 ..."

The fact shown above comprises two discrete objects, namely "GST-bax" and "bcl2." The metadata for the fact may indicate that "the experiment was performed with human bcl2 expressed and purified from CHO cells and recombinant GST fusions of human bax and bad in GST pulldown assays." Additional information associated with the facts may also be inputted by the information extractor. It should be apparent that the present invention is not restricted to fact-based-information extraction models. Several other types of information extraction models may also be used according to the present invention.

In the fact-based information extraction embodiment described above, the information extractor may input this information using natural language sentences, via user interface templates provided by server 12, using APIs provided by server 12, via diagrams or pictures, speech, fax, e-mail, or handwriting, or using any combinations of the aforementioned techniques and other techniques. Server 12 may be configured to parse the natural language sentences or templates, to identify facts and metadata, to identify objects and processes from the facts, and to determine ontological relationships between the objects and processes, and store the extracted information in the knowledge base.

While an information extractor is inputting information for a particular article, the information stored in database 13 for the article is updated by server 12 to indicate that the article is currently undergoing information extraction. After server 12 receives a signal from the information extractor indicating that information extraction for an article has been completed, the status information related to the article in database 13 is updated to indicate that information extraction for the article has been completed and that the article is now ready for the quality control process (step 67).

Server 12 may also allow an information extractor to provide comments related to an article. For example, if an information extractor experiences any problems in extracting information for an article, server 12 allows the information extractor to provide details related to the problem which are stored in database 13. These comments provide useful information which may be used for later processing of the article. For example, the comments may indicate deficiencies with the existing model for storing the extracted information, deficiencies in the criteria for selecting articles, etc. In a specific embodiment of the present invention, where the extracted information is stored in a knowledge base based on an ontology, server 12 may enable the information extractor to indicate or discuss new terms or concepts encountered in the extracted information. Information entered by the information extractor related to new terms or concepts may be used during the "information model review" phase (step 74) described below. The information extractor may also suggest a superclass for each new concept or term. Information input by the information extractor regarding the new terms or concepts may be stored in database 13.

Server 12 may also provide features allowing information extractors to access online help services. For example, server 12 may provide facilities allowing an information extractor to engage in real-time communication with a human or non-human help system. These help services may be used by an information extractor for several purposes, such as to learn more about the process or protocols for information extraction, to discuss problems which may arise during the information extraction process, and other purposes.

According to an embodiment of the present invention, as part of step 66, after information extraction has been completed for an article, server 12 automatically records metrics associated with the information extraction process for the article. These metrics may include information indicating the total number of facts entered for the article, the time taken by the information extractor to extract the facts, the length of the article, and other like information. The metrics information is associated with the article and stored in database 13. This information may be used for several purposes such as to improve and optimize the performance of the information extraction process, to calculate payments due to the information extractor, to determine the efficiency of the information extractor, to improve information extraction protocols/procedures, and for other purposes.

As stated above, after an information extractor has finished inputting information for an article according to step 66, the status of the article stored in database 13 is changed to indicate that the article is ready for quality control processing (step 67). The article is then automatically queued to undergo quality control processing. Upon entering the quality control stage, information related to the article stored in database 13 is updated by server 12 to indicate that the article is in the quality control processing stage. Quality control processing (step 68) is geared towards improving the accuracy of the data entered by the information extractors, ensuring that the information has been extracted according to protocols/procedures established by users of the present invention, identifying and correcting errors in the input data, determining error count per article, and performing other activities to improve the overall quality and efficiency of the information extraction process. In general, quality control processing ensures the accuracy and completeness of information being stored in information store 15.

Figure 5:
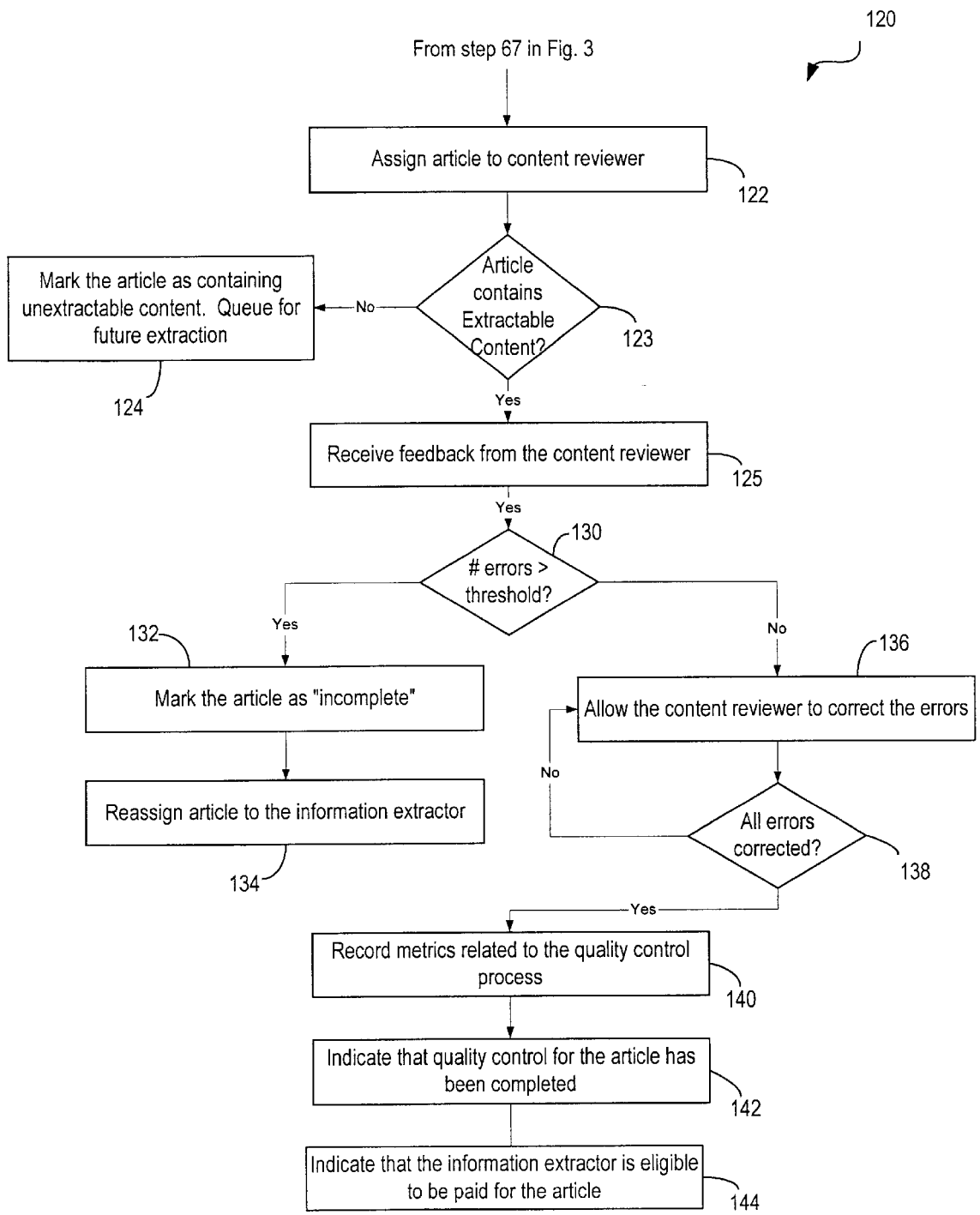
FIG. 5 is a simplified flowchart showing quality control processing performed by an embodiment of the present invention.

FIG. 5 is a simplified flowchart 120 showing quality control processing performed by an embodiment of the present invention as part of step 68 in FIG. 3. Quality control processing is generally initiated when an article, which has been tagged as ready for quality control, is assigned by server 12 to a content reviewer (step 122). An article may also be simultaneously assigned to more than one content reviewer. Assigning an article to more than one content reviewer enables redundant quality control processing. A content reviewer may be any human being or application program which is configured to perform quality control processing on the information input by the information extractor. A content reviewer may use client system 14 to view the article, to view information input by the information extractor for the article, and to provide feedback to server 12 regarding the input information. Server 12 provides various features to facilitate quality control processing. For example, user interfaces may be provided which allow a content reviewer to review the information extracted for an article. For example, in an embodiment where the information extractor has inputted the extracted information in the form of facts, upon selection of an article by the content reviewer, facts entered by the information extractor for the article may be displayed to the content reviewer.

Using the various features provided by server 12, the content reviewer determines and indicates to server 12 whether the article contains any extractable content (step 123). If the input received from the content reviewer indicates that there is no extractable content in the article, the article is tagged accordingly and queued for future information extraction (step 124). For example, an article may be tagged as not containing extractable content if the information contained in the article is outside the scope of the domain of interest to the user of the invention. The status information related to the article in database 13 is updated to indicate that the article has been queued for future information extraction.

If the article has extractable content, the content reviewer then assesses the structure and accuracy of the information input by the information extractor and indicates to server 12 if there are any errors in the extracted information input for the article by the information extractor (step 125). The errors may be due to inaccuracies in the extracted information input by the information extractor, due to the information extractor having failed to comply with established procedures/protocols for information extraction, errors of omission on the part of the information extractor, and other errors. If server 12 determines that the error count associated with the article is greater than a pre-configured threshold error value (step 130), server 12 reclassifies the article as "incomplete" (step 132). Information related to the article stored in database 13 is updated by server 12 to indicate the incomplete status of the article. The incomplete article is then reassigned to the information extractor for correction of the errors in the previously extracted information (step 134).

If the error count is below the threshold error value, server 14 then allows the content reviewer to correct the errors (step 136). According to an embodiment of the present invention, server 12 provides various services and user interfaces which allow the content reviewer to edit the extracted information for an article to correct the errors. For example, in the embodiment where information is extracted in the form of facts, modules executing on server 12 may allow the content reviewer to delete facts, copy facts, edit facts, and perform other like activities. These services and user interfaces may be accessed by the content reviewer using client system 14.

According to an embodiment of the present invention, after errors associated with the article have been corrected by the content reviewer (step 138), server 12 then automatically records metrics related to the quality control processing for the article (step 140). The metrics information recorded by server 12 may include the number of edits made by the content reviewer, the time taken for the quality control process for the article, the error count for the article, the type of errors encountered by the content reviewer, and other like information. The metrics information is associated with the article and stored in database 13.

Based on the quality control metrics information, server 12 computes a quality control score for the article which is stored in database 13. For example, in an embodiment of the present invention where the extracted information is stored in a knowledge base and uses a fact-based information retrieval protocol, the quality control score (QC) for an article may be calculated according to the following equation:

$$QC = \frac{\{[0.25*(FE+FM+ME+MM)+MF+(0.5*EF)]*100\}}{\text{Total Facts (post quality control)}}$$

wherein,

FE=measures the number of fact data errors. These are errors in the fact data input by the information extractor for the article;

FM=measures the missing fact data errors. These are errors of omission when an information extractor fails to input required fact information for the article;

ME=measures number of metadata errors. These are errors in the metadata input by the information extractor for the article;

MM=measures the missing metadata errors. These are errors of omission in the metadata information input by the information extractor for the article;

MF=measures the number of missing facts in the information input by the information extractor for the article;

EF=is the number of extraneous facts information input by the information extractor for the article. Extraneous facts are generally facts entered by the information extractor but which do not qualify as facts according to the information extraction protocol; and Total Facts=is the total number of facts for the article determined after the quality control process.

According to the formula shown above, a low QC score indicates high quality (ideally if there are no errors, QC=0). It should be apparent that various other formulae and variables may be used in alternative embodiments of the present invention.

The metrics information recorded by server 12 may also be used to generate reports related to the information extraction process. These reports may be generated on a periodic basis. The status of the article in database 13 is then updated to indicate that quality control for the article has been completed (step 142). The article is then queued up for the next processing step. According to an embodiment of the present invention, server 12 updates information associated with the information extractor in database 13 to indicate that the information extractor is eligible to be paid for the article (step 144).

Referring back to FIG. 3, after an article has successfully passed through the quality control step 68, the information extractor is compensated for extracting information for the article (step 70). This process may be automatically triggered when information stored in database 13 for the information extractor is updated by server 12 to indicate that the information extractor is eligible for receiving compensation for the article. Alternatively, the process may be automatically triggered when the status of an article is updated to indicate that quality control processing for the article has been completed. The process may also be triggered by the information extractor after the information extractor queries database 13 and determines that the article has completed the quality control process. Several different techniques may be used to compensate the information extractor. For example, the information extractor may be monetarily compensated, or may be compensated using other techniques such as points, stock options, etc.

According to an embodiment of the present invention, server 12 determines the payment due to the information extractor based on the quality of work performed by the information extractor which may be based on several factors such as the quality control score associated with the article, whether or not the article was reassigned for information extraction, the error count associated with the information input by the information extractor, and other like information. Information regarding the compensation payable to the information extractor is stored in database 13.

Figure 6:
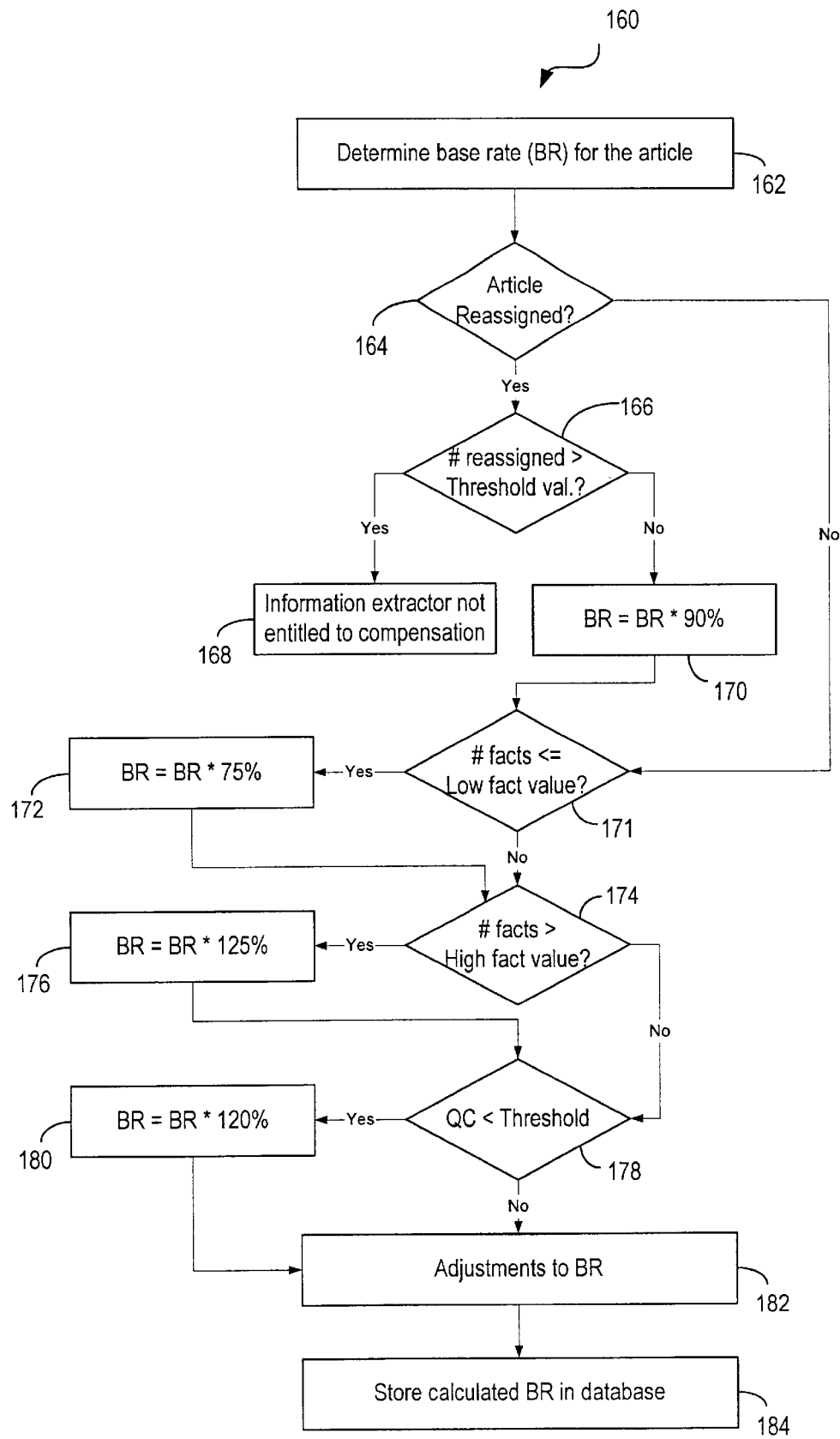
FIG. 6 is a simplified flowchart showing processing performed by an embodiment of the present invention for calculating the compensation due to an information extractor.

FIG. 6 is a simplified flowchart 160 showing processing performed by an embodiment of the present invention for automatically calculating the compensation due to an information extractor. This embodiment assumes that the information has been extracted using a fact-based information retrieval model. According to the embodiment depicted in FIG. 6, server 12 first determines a base rate (BR) of payment for the article (step 162). This base rate is generally stored in database 13. Server 12 then determines if the article was ever reassigned to the information extractor for corrections (step 164). If it is determined that the article was never reassigned, processing continues with step 171. If the article was reassigned, server 12 then determines the number of times that the article was reassigned (step 166). If the number of times that the article was reassigned is above a threshold value, server 12 may indicate that the information extractor is not entitled to compensation for the article (step 168). Information to this effect may be stored in database 13. If the number of times that the article was reassigned is equal to or below the threshold value, a new base rate is calculated by multiplying the current base rate by 90% (step 170). Processing then continues with step 171.

In step 171, server 12 compares the total number of facts for the article with a user-configurable low fact watermark value. According to a specific embodiment, the low fact watermark value is set to 10. If the fact count for the article is less than or equal to the low fact watermark value, a new base rate is calculated by multiplying the current base rate by 75% (step 172). Processing then continues with step 174. If the fact count for the article is greater than the low fact watermark value processing continues with step 174. In step 174, server 12 compares the total number of facts for the article with a user-configurable high fact watermark value. According to a specific embodiment, the high fact watermark value is set to 50. If the fact count for the article is greater than the high fact watermark value, a new base rate is calculated by multiplying the current base rate by 125% (step 176). Processing then continues with step 178. If the fact count for the article is less than or equal to the high fact watermark value, processing continues with step 178.

Server 12 then compares the quality score associated with the article with a user-configurable quality score threshold (step 178). In an embodiment where lower quality scores correspond to better quality, if the quality score associated with the article is less than the quality score threshold, i.e. indicating high quality, a new base rate is calculated by multiplying the current base rate by 120% (step 180). Processing then continues with step 182. If the quality score is greater than or equal to the quality score threshold, processing continues with step 182.

In step 182, adjustments may be made to the calculated payment rate. For example, adjustments may be made based on the geographical locations of the information extractors, e.g. information extractors located in countries outside the US may be paid a higher or lower rate depending on the prevailing market rates in that country. After the adjustments have been made, the final calculated payment rate indicates the compensation amount due to the information extractor for the article. This information is then stored in database 13 to facilitate payment of the amount to the information extractor (step 184).

It should be apparent that the flowchart depicted in FIG. 6 describes processing performed according to a specific embodiment of the present invention. Likewise, the percentage multipliers described above illustrate a particular embodiment of the present invention. Several other techniques and multipliers may be used for calculating compensation due to the information extractor according to other embodiments of the present invention.

The actual payment of the compensation amount to the information extractor may also be achieved using various techniques. According to a specific embodiment, server 12 may send a message to an accounts payable application instructing the accounts payable application to issue a check to the information extractor for the amount owed. Alternatively, server 12 may itself perform processing to pay the information extractor. For example, the present invention may automatically credit the information extractor's account for the amount due. The present invention may also issue a check to the information extractor for the amount owed. In an alternative embodiment, server 12 may provide interfaces which allow accounts payable personnel to access information stored in database 13. Information regarding the amount paid to the information extractor, when the amount was paid, and other like information may be recorded in database 13.

Figure 7:
FIG. 7 depicts an exemplary web page which may be displayed to the information extractor.

Server 12 may also provide user interfaces which allow information extractors to determine the status of the articles for which they have extracted information. For example, a web page may be displayed for each information extractor displaying the status of the various articles for which the information extractor has extracted information. The web page may also display the status of compensation payment for each article. FIG. 7 depicts an exemplary web page 190 which may be displayed to the information extractor by server 12. As shown in FIG. 7, web page 190 may display information 191 related to the information extractor such as the name of the information extractor, the country of residence of the information extractor, and the identification number of the information extractor. As previously stated, the identification number is usually assigned by server 12 to uniquely identify the information extractor. Web page 190 may also display a list of articles 192 assigned to the information extractor for information extraction. Each article may be identified by an article identification number which, as previously stated, may be assigned by server 12. For each article in the list, the status/progress of the article in the information extraction process may be displayed. Web page 190 may also display quality control related metrics such as the "Fact Range" the quality score calculated for the article, and other like information. The "Fact Range" indicates the number of facts in an article which may be used to determine the information extractor's compensation. For example, if an article has 10 or fewer facts it may be classified as belonging to the "low" fact range and the information extractor gets paid at a lower rate. If the article has 11 to 50 facts, the article may be classified as belonging to the "normal" fact range and the pay rate is adjusted accordingly. If there are 51 or more facts the article may be classified as belonging to the "above" normal fact range and the pay rate is higher. The calculation of the pay rate based on the number of facts in an article has been described above with respect to FIG. 6. Additionally, web page 190 may also display payment related information 193.

Referring back to FIG. 3, after quality control processing for an article has been completed, the status of the article in database 13 is updated to indicate that the article is now ready for the next processing phase. The article may then be queued up for a "information model review" stage during which model reviewers are allowed to review the information extracted from the article and determine if the model used for storing the information in information store 15 needs to be changed to accommodate the extracted information (step 74). The "information model" for an information store refers to the information representation used to store the information in information store 15. For example, for a knowledge base, the "model" may refer to an ontology used to represent the knowledge in the knowledge base. As stated above, an ontology is typically a representation of the world or a part of the world. For a relational database, the "model" may refer to the table structure used to store information. The model reviewers may be human beings trained to review the extracted information or application programs configured to perform the review.

Server 12 provides several services and user interfaces which facilitate the model review process and which allow model reviewers to review, change, or update the existing information model structure. Model reviewers may perform these activities using client systems 14 coupled to server 12 via communication network 16. For example, if the information is stored in a knowledge base according to an ontology, the model reviewers (or ontologists), can review new terms or concepts that are introduced in the information extracted from the articles and make appropriate changes to the ontology.

Figure 8:
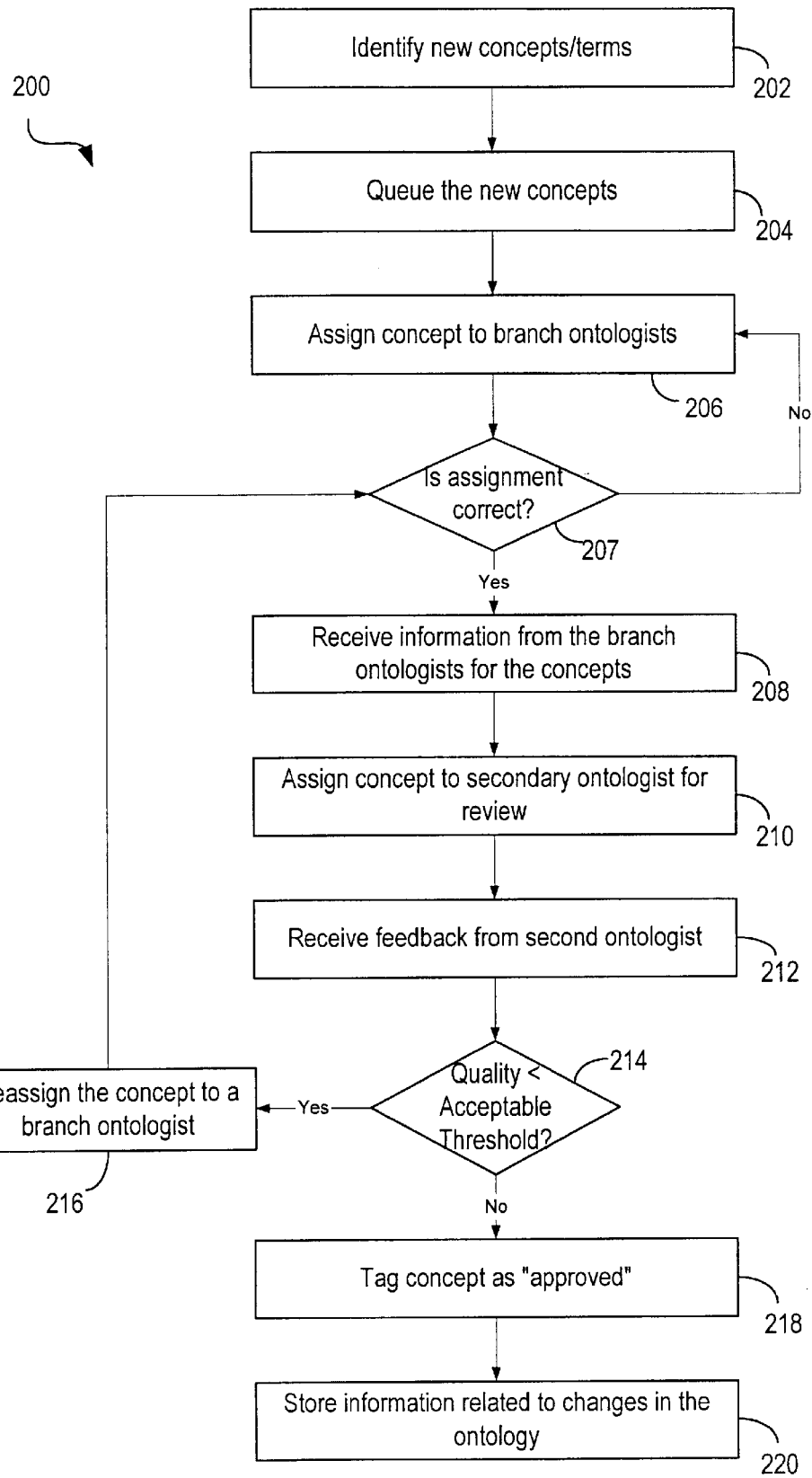
FIG. 8 is a simplified flowchart showing processing performed by an embodiment of the present invention for reviewing new concepts or terms and making changes to the ontology to accommodate the new concepts or terms.

FIG. 8 is a simplified flowchart 200 showing processing performed by an embodiment of the present invention during the information model review stage. For the embodiment depicted in FIG. 8, it is assumed that information extraction is based on a fact-based model and the extracted information is stored in a knowledge base based on an ontology. Flowchart 200 depicts processing performed by the embodiment of the present invention for reviewing new concepts or terms and making changes to the ontology to accommodate the new concepts or terms. The process is initiated when server 12 identifies the new concepts associated with the extracted information (step 202). Information for each concept may be stored in database 13. As previously described, information regarding the possible presence of new concepts in the extracted information is generally indicated by the information extractor while inputting the extracted information during step 66 in FIG. 3. For example, the information input by the information extractor may indicate the new concepts for the articles, the suggested superclass for each concept, information describing each concept, etc. Information stored in database 13 for each concept may also include information about the source of the concept, the date when the new concept was input to server 12, and other like information.

Server 12 then prioritizes the concepts and queues them up for assignment to the ontology reviewers (step 204).

According to an embodiment of the present invention, server 12 may prioritize the concepts based upon the same prioritization criteria used for prioritizing the articles. According to another embodiment, concepts which require changes to the ontology may be given a high priority since the ontology needs to be changed before the fact corresponding to the concept can be entered into the knowledge base.

The new concepts or terms from the queue may then be triaged or assigned to ontologists that are responsible for different branches of the ontology (also called "branch ontologists") (step 206). Information associated with the concepts in database 13 is updated to identify the branch ontologist to whom the concept was assigned. According to an embodiment of the present invention, the assignment may be automatically driven by the superclass suggested for the new concept. For example, if a new concept like "mouse" comes up, and has a suggested superclass of "mammal" associated with it, the new concept may be automatically assigned by server 12 to the branch ontologist responsible for the "mammals" branch of the ontology.

Server 12 then allows the branch ontologist to whom the concept was assigned to indicate if the assignment was correct (step 207). If the concept was erroneously assigned to the branch ontologist or if the branch ontologist prefers to assign the concept to another branch ontologist, server 12 provides services to assign the concept to another branch ontologist. If the concept was correctly assigned, processing continues with step 208.

Once the triage is done, the primary ontologist to whom a concept is assigned is allowed to review the concept and information related to the concept to determine if the ontology needs to be changed to accommodate the concept. Server 12 may provide several user interfaces and services which facilitate the concept review process. For example, server 12 may provide services for viewing the new concepts, sorting the concepts based on several criteria, viewing the suggested superclasses, adding/deleting new objects, adding/deleting slots, etc. The branch ontologist may use these services and user interfaces to review information related to the concept and to provide concept review information to server 12 (step 208). The concept review information input by the branch ontologist may include classification information for the new concept, information defining or documenting the new concept, and other information. The branch ontologist may also input information for modeling the concept in the ontology.

After the branch ontologist has indicated that review of a concept has been completed, information associated with the concept in database 13 is updated to indicate that concept review has been completed and that the concept is now awaiting approval from a secondary ontologist. The concept is then assigned to a secondary ontologist (step 210) who reviews the information provided by the primary branch ontologist and checks it for quality. Server 12 may provide user interfaces and services which allow the secondary ontologist to review information input by the primary ontologist and to make changes to the information when necessary. The secondary ontologist provides feedback on the work of the first ontologist to server 12 (step 212). If the quality of work of the primary ontologist is below a user-configurable acceptable quality threshold (step 214), the concept is returned/reassigned to the primary ontologist for correction (step 216). Information associated with the reassigned concept may indicate errors identified by the secondary ontologist in the information input by the primary branch ontologist. If the quality is above the threshold (i.e. the second ontologist has "approved" the new concept), information associated with the concept stored in database 13 is updated to indicate that the concept or term has been approved (step 218). Server 12 keeps track of the changes made to the ontology and the concepts/terms that have been modeled. The information related to the changes may then be stored in database 13 (step 220). After new concepts associated with an article have been reviewed and approved, changes may then be made to the ontology. The facts associated with these concepts are then ready to be stored in information store 15. Status information for the article in database 13 is updated to indicate that information from the article is ready to be stored in information store 15.

According to an embodiment of the present invention, the processing depicted in FIG. 8 ensures that the extracted information will not be loaded into the information store 15 until changes to the information model have been proposed, reviewed, and accepted. This ensures that the facts related information entered in the information store 15 does not violate the information model used for storing the information in information store 15.

When the information store is a relational database comprising a plurality of tables, the model reviewer determines if the structure of one or more tables or the relationships between the tables need to be changed to accommodate the information entered by the information extractor. Server 12 may provide interfaces and services to facilitate the review and change process. Likewise, server 12 may provide facilities for reviewing and amending the information models for other types of information stores such as object-oriented databases, and the like.

After server 12 receives an indication from the model reviewer that the model reviewer has completed review of the model for an article, server 12 changes the status of the article in database 13 to indicate completion of the model review phase for the article and to indicate that knowledge extracted from the article is now ready to be deposited in information store 15.

Referring back to FIG. 3, after model review for an article has been completed, the information extracted from the article is automatically deposited and stored in information store 15 (step 76). As part of step 76, server 12 may process the extracted information and convert it to a format suitable for storage in information store 15. The information is then added to information store 15. For example, in a specific embodiment of the present invention wherein information store 15 is a knowledge base, server 12 may translate the extracted information to a format which is suitable for storing in a knowledge base. Server 12 may check that the frames to which the information is to be added exist. Server 12 may also add slots to the frames and then populate the slots with the extracted information. The translated information may then be stored in the knowledge base.

As described above, the present invention manages the process of information extraction and storage. It should be apparent that the steps shown in FIG. 3 can be performed concurrently. For example, while an information extractor is entering extracted information for a first article, the present invention may be performing quality control processing on a second article for which the information has already been input, performing model review for a third article, and may be storing information in information store 15 for a fourth article, and so on. Accordingly, the tasks of identifying articles, identifying information extractors, receiving the extracted information, quality control processing, model review, and storage of information can be performed in parallel and in stages.

Figure 9A:
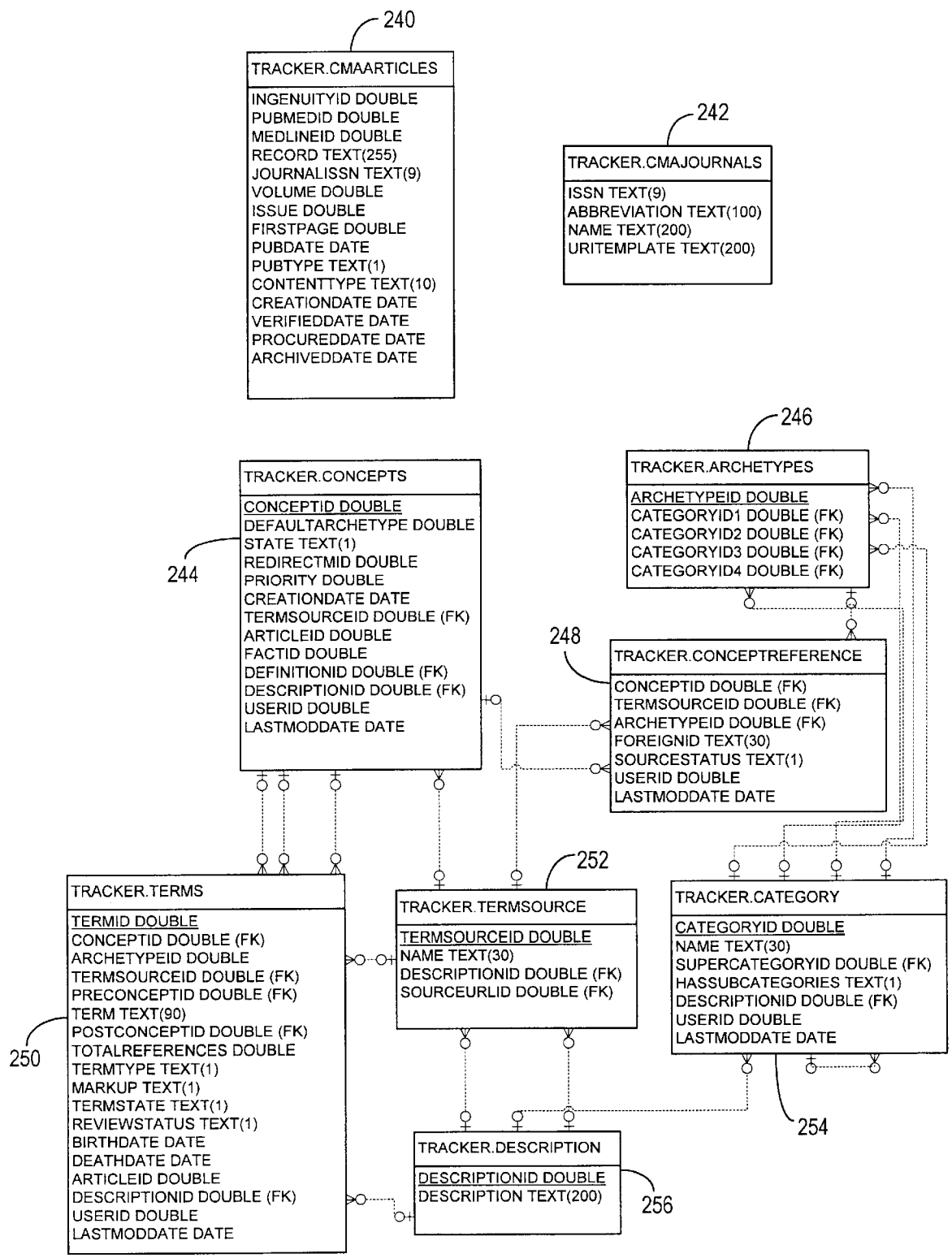
FIGS. 9A–9C depict information which may be stored in a database according to an embodiment of the present invention.
Figure 9B:
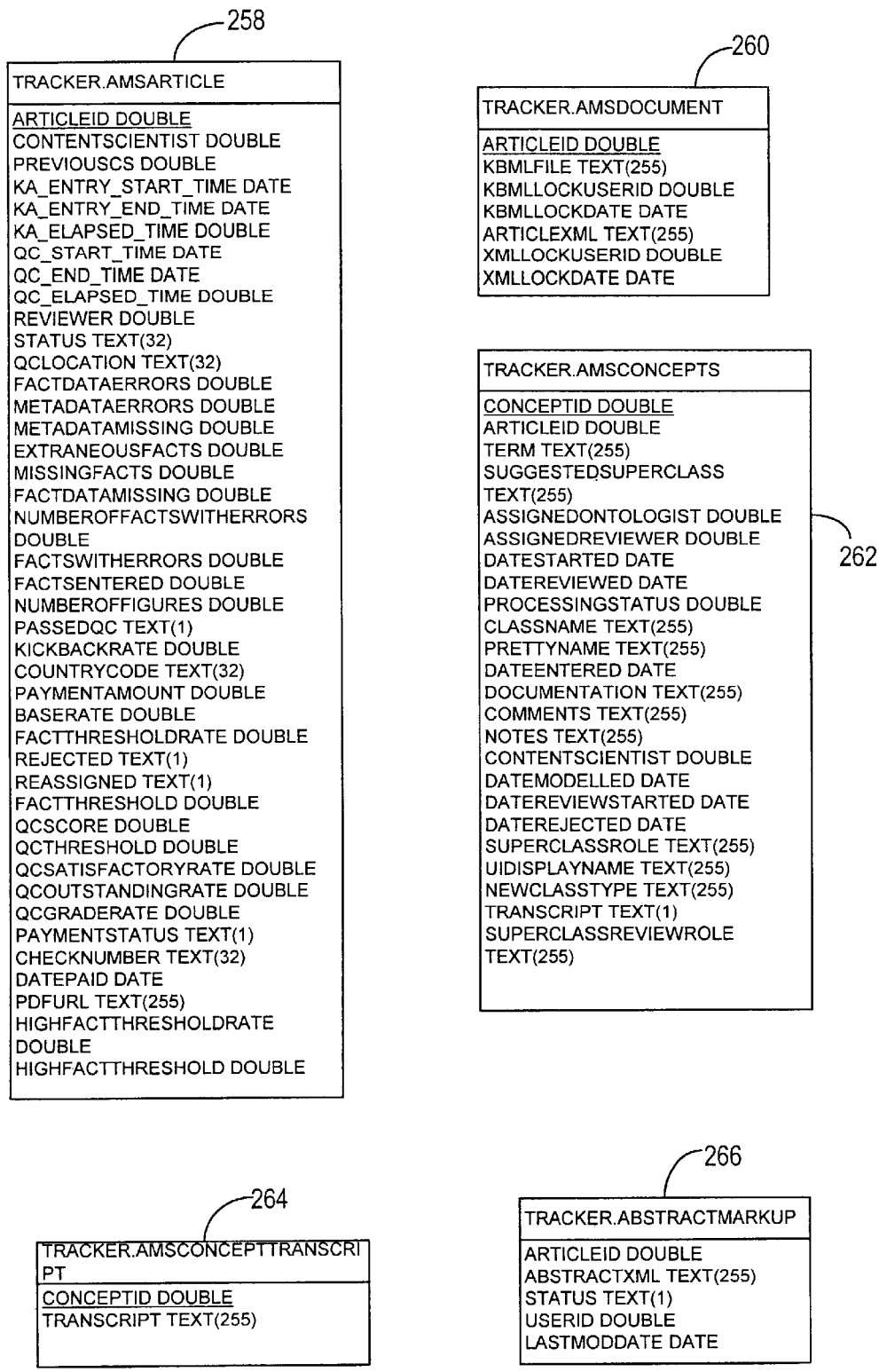
Figure 9C:
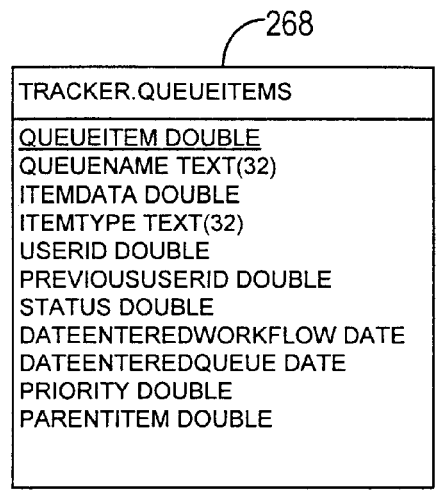
Figure 9C:
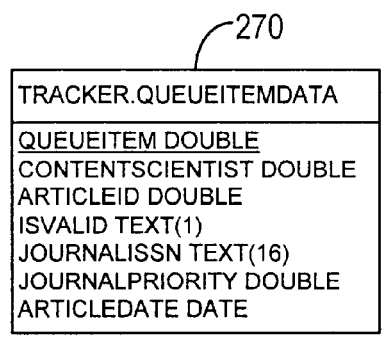
Figure 9C:
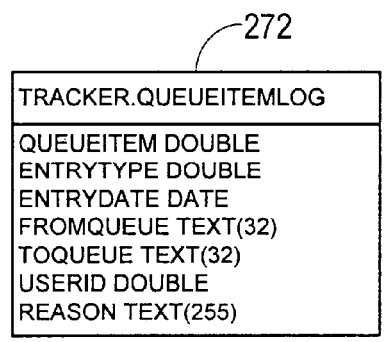

FIGS. 9A–9C depict information which may be stored in database 13 according to an embodiment of the present invention. In the embodiment depicted in FIGS. 9A–9C, the information is stored in the form of tables with links between the tables. Table *Concepts* 244 stores information for concepts which may be included in user criteria 52 (see FIG. 3) and used for identifying articles from which information is to be extracted. Information about the terms which may be used to describe the concepts is stored in Table *Terms* 250. Table *ConceptReference* 248 stores information which is used to map the terms to the concepts. Information regarding the source and description of the terms is stored in Table *TermSource* 252 and Table *Description* 256, respectively. Information related to the various categories used for searching the articles is stored in Table *Category* 254. Contextual information related to the categories is stored in Table *ArcheTypes* 246. For example, if a "gene" category was used for the search, Table *ArcheTypes* 246 may store contextual information about the gene such as the type of the gene, the organismal source of the gene, the chemical structure of the gene, and other like information.

Tables *CMAArticles* 240 and *CMAJournals* 242 store information about articles which are candidates for information extraction. The stored information may include information which allows information extractors to access the article, such as URL information. These tables also store publication date information for the articles, the date when the article was identified, and other descriptive information for the article.

As previously described, a variety of metrics information is captured at various stages of the processing. Table *AMSArticle* 258 stores the metrics information for the articles. The stored information may include metrics related to the information extraction process, metrics recorded during the quality control process, information for calculating the quality control score for each article, metrics used for determining the amount of compensation due to information extractors, and other like information.

Table *AMSConcepts* 262 stores information about new concepts or terms that need to be modeled in the ontology. The information in Table *AMSConceptTranscript* 264 is updated by the ontologists during the model review stage, and describes how new concepts are to be modeled in the ontology. Table *AMSDocument* 260 stores information which is used for converting the extracted information into a format which facilitates storage in the knowledge base. Table *AbstractMarkup* 266 stores results related to the automatic verification of articles based on the titles and/or the abstracts of the articles. This information may indicate why a particular article was or was not deemed relevant by server 12. This information may be used to manually verify and categorize articles which could not be unambiguously verified and categorized by server 12.

As described above, queues are used at various stages of processing. Tables *QueueItems* 268, *QueueItemData* 270, and *QueueItemLog* 272 store information related to the queues. Table *QueueItems* 268 stores information mapping individual items and the queues containing the items. Table *QueueItemData* 270 stores information which is used for prioritizing the articles in the queues. Table QueueItemLog 272 is used for logging information related to the queue items. It should be apparent that FIGS. 9A–9C describe a specific embodiment of the present invention and do not limit the scope of the present invention as recited in the claims.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. For example, the present invention may be used to extract and store information for any domain or industry which benefits from the information extraction and storage. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware or only in software or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A computer-implemented method of storing information in an information store, the computer-implemented method comprising:

identifying a plurality of articles from which information is to be extracted;

identifying a plurality of information extractors for extracting information from the plurality of articles;

providing a database for storing information related to the plurality of articles and the plurality of information extractors;

assigning the plurality of articles to the plurality of information extractors for information extraction, wherein a first article from the plurality of articles is assigned to a first information extractor from the plurality of information extractors;

receiving information extracted by the first information extractor from the first article;

storing the information extracted by the first information extractor from the first article in the information store;

enabling a content reviewer to review the extracted information received from the first information extractor for the first article;

receiving information from the content reviewer identifying errors associated with the extracted information received from the first information extractor for the first article;

determining, from the information received from the content reviewer, an error count indicating number of errors in the extracted information received from the first information extractor for the first article;

storing the error count in the database;

determining if the error count is above a threshold error count level;

if the error count is above the threshold error level, reassigning the first article to the first information extractor for information extraction; and if the error count is equal to or below the threshold error level, enabling the content reviewer to change the extracted information received from the first information extractor for the first article to correct the errors.

2. The method of claim 1 wherein identifying the plurality of articles comprises:

receiving criteria for selecting articles from which information is to be extracted; and identifying the plurality of articles which are relevant to the criteria for selecting articles.

3. The method of claim 2 wherein assigning the plurality of articles to the plurality of information extractors comprises:

computing a priority score for each article in the plurality of articles based on a degree of relevancy of the article to the criteria for selecting the articles, such that an article with a high degree of relevancy is computed a higher priority score than an article with a low degree of relevancy to the criteria for selecting the articles; and assigning articles from the plurality of articles to the plurality of information extractors based on the priority scores associated with the articles, such that articles with higher priority scores are assigned before articles with lower priority scores.

4. The method of claim 2 wherein receiving the criteria for selecting articles comprises receiving names of information sources and terms specific to a domain.

5. The method of claim 1 wherein identifying the plurality of articles from which information is to be extracted comprises:

storing access information for the plurality of articles in the database, wherein the access information enables the plurality of information extractors to access the plurality of articles.

6. The method of claim 5 wherein storing the access information for the plurality of articles comprises:

determining a first set of articles from the plurality of articles which are available in electronic format;

storing electronic copies of the articles in the first set in the database;

determining a second set of articles from the plurality of articles which are not available in electronic format;

scanning paper copies of the articles in the second set to generate electronic versions of the articles in the second set; and storing the electronic versions of the articles in the second set in the database.

7. The method of claim 5 wherein storing the access information for the plurality of articles comprises:

determining uniform resource locator (URL) information for at least one article from the plurality of articles; and storing the URL information for the at least one article in the database.

8. The method of claim 1 wherein identifying the plurality of information extractors comprises:

receiving information related to a plurality of candidates;

determining a first set of candidates from the plurality of candidates who have completed online certification;

determining a second set of candidates from the first set of candidates who have passed testing procedures; and designating the second set of candidates as the plurality of information extractors.

9. The method of claim 1 wherein receiving the information extracted by the first information extractor from the first article comprises:

providing a user interface; and receiving the information extracted from the first article via the user interface.

10. The method of claim 1 further comprising:
  determining if the errors associated with the information extracted from the first article by the first information extractor have been corrected; and
  if the errors have been corrected:
    calculating a quality score for the first article based upon the error count; and
    storing the quality score in the database.

11. The method of claim 10 further comprising:
  if the errors have been corrected:
    determining a compensation amount to be paid to the first information extractor for extracting information from the first article; and
    storing the compensation amount in the database.

12. The method of claim 11 wherein determining the compensation amount to be paid to the first information extractor comprises:
  calculating the compensation amount based upon the error count and the quality score for the first article.

13. The method of claim 1 wherein the information store is configured to store the extracted information according to an information model, the method further comprising:
  before storing the extracted information for the first article in the information store, enabling model reviewers to make changes to the information model based on the information extracted by the first information extractor from the first article.

14. The method of claim 13 wherein the information store is a knowledge base and the information model is an ontology for the knowledge base.

15. The method of claim 1 wherein the information store is a knowledge base configured to store the extracted information according to an ontology, the method further comprising:
  before storing the extracted information into the knowledge base:
    receiving concept information identifying a concept associated with the extracted information received from the first information extractor for the first article;
    enabling a first reviewer to review the concept information; and
    receiving information from the first reviewer identifying changes to be made to the ontology.

16. The method of claim 15 further comprising:
  enabling a second reviewer to review the information received from the first reviewer; and
  making changes to the ontology based on the information received from the first reviewer after the second reviewer approves of the information received from the first reviewer.

17. A computer-implemented method of storing information in an information store, the information store configured to store the extracted information according to an information model, the computer-implemented method comprising:
  identifying a plurality of articles from which the information is to be extracted;
  identifying information extractors for extracting the information from the plurality of articles;
  storing information related to the plurality of articles and the information extractors in a database;
  assigning the plurality of articles to the information extractors; and
  for each article from the plurality of articles:
    receiving information extracted from the article by the information extractor to whom the article is assigned;
    storing the extracted information in the database;
    storing the information extracted from the article in the information store, wherein the information store is a knowledge base configured to store the extracted information according to an ontology.

18. The method of claim 17, further comprising:
  enabling content reviewers to identify and correct errors associated with the extracted information;
  enabling model reviewers to identify and make changes to the information model of the information store based on the information extracted from the article.

19. A computer system for storing information comprising:
  a processor;
  a memory coupled to the processor, the memory configured to store a plurality of code modules for execution by the processor, the plurality of code modules comprising:
    a code module for identifying a plurality of articles from which information is to be extracted;
    a code module for identifying a plurality of information extractors for extracting information from the plurality of articles;
    a code module for storing information related to the plurality of articles and the plurality of information extractors in a database;
    a code module for assigning the plurality of articles to the plurality of information extractors for information extraction, wherein a first article from the plurality of articles is assigned to a first information extractor from the plurality of information extractors;
    a code module for receiving information extracted by the first information extractor from the first article;
    a code module for storing the information extracted by the first information extractor from the first article in an information store;
    a code module for enabling a content reviewer to review the extracted information received from the first information extractor for the first article;
    a code module for receiving information from the content reviewer identifying errors associated with the extracted information received from the first information extractor for the first article;
    a code module for determining, from the information received from the content reviewer, an error count indicating number of errors in the extracted information received from the first information extractor for the first article;
    a code module for storing the error count in the database;
    a code module for determining if the error count is above a threshold error count level;
    if the error count is above the threshold error level, a code module for reassigning the first article to the first information extractor for information extraction; and
    if the error count is equal to or below the threshold error level, a code module for enabling the content reviewer to change the extracted information received from the first information extractor for the first article to correct the errors.

20. The system of claim 19 wherein the code module for identifying the plurality of articles comprises:
  a code module for receiving criteria for selecting articles from which information is to be extracted; and a code module for identifying the plurality of articles which are relevant to the criteria for selecting articles.

21. The system of claim 20 wherein the code module for assigning the plurality of articles to the plurality of information extractors comprises:
   a code module for computing a priority score for each article in the plurality of articles based on a degree of relevancy of the article to the criteria for selecting the articles, such that an article with a high degree of relevancy is computed a higher priority score than an article with a low degree of relevancy to the criteria for selecting the articles; and
   a code module for assigning articles from the plurality of articles to the plurality of information extractors based on the priority scores associated with the articles, such that articles with higher priority scores are assigned before articles with lower priority scores.

22. The system of claim 20 wherein the code module for receiving the criteria for selecting articles comprises a code module for receiving names of information sources and terms specific to a domain.

23. The system of claim 19 wherein the code module for identifying the plurality of articles from which information is to be extracted comprises:
   a code module for storing access information for the plurality of articles in the database, wherein the access information enables the plurality of information extractors to access the plurality of articles.

24. The system of claim 23 wherein the code module for storing the access information for the plurality of articles comprises:
   a code module for determining a first set of articles from the plurality of articles which are available in electronic format;
   a code module for storing electronic copies of the articles in the first set in the database;
   a code module for determining a second set of articles from the plurality of articles which are not available in electronic format;
   a code module for scanning paper copies of the articles in the second set to generate electronic versions of the articles in the second set; and
   a code module for storing the electronic versions of the articles in the second set in the database.

25. The system of claim 23 wherein the code module for storing the access information for the plurality of articles comprises:
   a code module for determining uniform resource locator (URL) information for at least one article from the plurality of articles; and
   a code module for storing the URL information for the at least one article in the database.

26. The system of claim 19 wherein the code module for identifying the plurality of information extractors comprises:
   a code module for receiving information related to a plurality of candidates;
   a code module for determining a first set of candidates from the plurality of candidates who have completed online certification;
   a code module for determining a second set of candidates from the first set of candidates who have passed testing procedures; and
   a code module for designating the second set of candidates as the plurality of information extractors.

27. The system of claim 19 wherein the code module for receiving the information extracted by the first information extractor from the first article comprises:
   a code module for providing a user interface; and
   a code module for receiving the information extracted from the first article via the user interface.

28. The system of claim 1 wherein the plurality of code modules stored by the memory further comprises:
   a code module for determining if the errors associated with the information extracted from the first article by the first information extractor have been corrected; and
   if the errors have been corrected:
      a code module for calculating a quality score for the first article based upon the error count; and
      a code module for storing the quality score in the database.

29. The system of claim 28 wherein the plurality of code modules stored by the memory further comprises:
   if the errors have been corrected:
      a code module for determining a compensation amount to be paid to the first information extractor for extracting information from the first article; and
      a code module for storing the compensation amount in the database.

30. The system of claim 29 wherein the code module for determining the compensation amount to be paid to the first information extractor comprises:
   a code module for calculating the compensation amount based upon the error count and the quality score for the first article.

31. The system of claim 19 wherein the information store is configured to store the extracted information according to an information model, and wherein the plurality of code modules stored by the memory further comprises:
   a code module for enabling model reviewers to make changes to the information model based on the information extracted by the first information extractor from the first article before storing the extracted information for the first article in the information store.

32. The system of claim 31 wherein the information store is a knowledge base and the information model is an ontology for the knowledge base.

33. The system of claim 19 wherein the information store is a knowledge base configured to store the extracted information according to an ontology, and wherein the plurality of code modules stored by the memory further comprises:
   a code module for receiving concept information identifying a concept associated with the extracted information received from the first information extractor for the first article before storing the extracted information into the knowledge base;
   a code module for enabling a first reviewer to review the concept information; and
   a code module for receiving information from the first reviewer identifying changes to be made to the ontology.

34. The system of claim 33 wherein the plurality of code modules stored by the memory further comprises:
   a code module for enabling a second reviewer to review the information received from the first reviewer; and
   a code module for making changes to the ontology based on the information received from the first reviewer after the second reviewer approves of the information received from the first reviewer.

35. A networked system for storing information comprising:

a communication network;

a computer system coupled to the communication network;

an information store coupled to the computer system, the information store configured to store the information according to an information model; and a database coupled to the communication network;

wherein the computer system is configured to:
identify a plurality of articles from which the information is to be extracted;
identify information extractors for extracting the information from the plurality of articles;
store information related to the plurality of articles and the information extractors in a database;
assign the plurality of articles to the information extractors; and
for each article from the plurality of articles:
receive information extracted from the article by the information extractor to whom the article is assigned;
store the extracted information in the database;
store the information extracted from the article in the information store, wherein the information store is a knowledge base configured to store the extracted information according to an ontology.

36. The system of claim 35, further comprising:
enable content reviewers to identify and correct errors associated with the extracted information;
enable model reviewers to identify and make changes to the information model of the information store based on the information extracted from the article.

37. A computer program product stored on a computer-readable medium for storing information in an information store, the computer program product comprising:
code for identifying a plurality of articles from which information is to be extracted;
code for identifying a plurality of information extractors for extracting information from the plurality of articles;
code for providing a database for storing information related to the plurality of articles and the plurality of information extractors;
code for assigning the plurality of articles to the plurality of information extractors for information extraction, wherein a first article from the plurality of articles is assigned to a first information extractor from the plurality of information extractors;
code for receiving information extracted by the first information extractor from the first article; and
code for storing the information extracted by the first information extractor from the first article in the information store;
code for enabling a content reviewer to review the extracted information received from the first information extractor for the first article;
code for receiving information from the content reviewer identifying errors associated with the extracted information received from the first information extractor for the first article;
code for determining, from the information received from the content reviewer, an error count indicating number of errors in the extracted information received from the first information extractor for the first article;
code for storing the error count in the database;
code for determining if the error count is above a threshold error count level;

if the error count is above the threshold error level, code for reassigning the first article to the first information extractor for information extraction; and if the error count is equal to or below the threshold error level, code for enabling the content reviewer to change the extracted information received from the first information extractor for the first article to correct the errors.

38. The computer program product of claim 37 wherein the code for identifying the plurality of articles comprises:
code for receiving criteria for selecting articles from which information is to be extracted; and
code for identifying the plurality of articles which are relevant to the criteria for selecting articles.

39. The computer program product of claim 38 wherein the code for assigning the plurality of articles to the plurality of information extractors comprises:
code for computing a priority score for each article in the plurality of articles based on a degree of relevancy of the article to the criteria for selecting the articles, such that an article with a high degree of relevancy is computed a higher priority score than an article with a low degree of relevancy to the criteria for selecting the articles; and
code for assigning articles from the plurality of articles to the plurality of information extractors based on the priority scores associated with the articles, such that articles with higher priority scores are assigned before articles with lower priority scores.

40. The computer program product of claim 38 wherein code for receiving the criteria for selecting articles comprises code for receiving names of information sources and terms specific to a domain.

41. The computer program product of claim 37 wherein the code for identifying the plurality of articles from which information is to be extracted comprises:
code for storing access information for the plurality of articles in the database, wherein the access information enables the plurality of information extractors to access the plurality of articles.

42. The computer program product of claim 41 wherein the code for storing the access information for the plurality of articles comprises:
code for determining a first set of articles from the plurality of articles which are available in electronic format;
code for storing electronic copies of the articles in the first set in the database;
code for determining a second set of articles from the plurality of articles which are not available in electronic format;
code for scanning paper copies of the articles in the second set to generate electronic versions of the articles in the second set; and
code for storing the electronic versions of the articles in the second set in the database.

43. The computer program product of claim 41 wherein the code for storing the access information for the plurality of articles comprises:
code for determining uniform resource locator (URL) information for at least one article from the plurality of articles; and
code for storing the URL information for the at least one article in the database.

44. The computer program product of claim 37 wherein the code for identifying the plurality of information extractors comprises:

code for receiving information related to a plurality of candidates;

code for determining a first set of candidates from the plurality of candidates who have completed online certification;

code for determining a second set of candidates from the first set of candidates who have passed testing procedures; and code for designating the second set of candidates as the plurality of information extractors.

45. The computer program product of claim 37 wherein the code for receiving the information extracted by the first information extractor from the first article comprises:

code for providing a user interface; and code for receiving the information extracted from the first article via the user interface.

46. The computer program product of claim 37 further comprising:

code for determining if the errors associated with the information extracted from the first article by the first information extractor have been corrected; and if the errors have been corrected:

code for calculating a quality score for the first article based upon the error count; and code for storing the quality score in the database.

47. The computer program product of claim 46 further comprising:

if the errors have been corrected:

code for determining a compensation amount to be paid to the first information extractor for extracting information from the first article; and code for storing the compensation amount in the database.

48. The computer program product of claim 47 wherein the code for determining the compensation amount to be paid to the first information extractor comprises:

code for calculating the compensation amount based upon the error count and the quality score for the first article.

49. The computer program product of claim 37 wherein the information store is configured to store the extracted information according to an information model, the computer program product further comprising:

code for enabling model reviewers to make changes to the information model based on the information extracted by the first information extractor from the first article before storing the extracted information for the first article in the information store.

50. The computer program product of claim 49 wherein the information store is a knowledge base and the information model is an ontology for the knowledge base.

51. The computer program product of claim 37 wherein the information store is a knowledge base configured to store the extracted information according to an ontology, the computer program product further comprising:

before storing the extracted information into the knowledge base:

code for receiving concept information identifying a concept associated with the extracted information received from the first information extractor for the first article;

code for enabling a first reviewer to review the concept information; and code for receiving information from the first reviewer identifying changes to be made to the ontology.

52. The computer program product of claim 51 further comprising:

code for enabling a second reviewer to review the information received from the first reviewer; and code for making changes to the ontology based on the information received from the first reviewer after the second reviewer approves of the information received from the first reviewer.

53. A computer program product stored on a computer-readable medium for storing information in an information store, the information store configured to store the extracted information according to an information model, the computer program product comprising:

code for identifying a plurality of articles from which the information is to be extracted;

code for identifying information extractors for extracting the information from the plurality of articles;

code for storing information related to the plurality of articles and the information extractors in a database;

code for assigning the plurality of articles to the information extractors; and for each article from the plurality of articles:

code for receiving information extracted from the article by the information extractor to whom the article is assigned;

code for storing the extracted information in the database;

code for storing the information extracted from the article in the information store, wherein the information store is a knowledge base configured to store the extracted information according to an ontology.

54. The computer program product of claim 53, further comprising:

code for enabling content reviewers to identify and correct errors associated with the extracted information;

code for enabling model reviewers to identify and make changes to the information model of the information store based on the information extracted from the article.

55. The method of claim 17 wherein identifying the plurality of articles comprises:

receiving criteria for selecting articles from which information is to be extracted; and identifying the plurality of articles which are relevant to the criteria for selecting articles.

56. The method of claim 55 wherein assigning the plurality of articles to the plurality of information extractors comprises:

computing a priority score for each article in the plurality of articles based on a degree of relevancy of the article to the criteria for selecting the articles, such that an article with a high degree of relevancy is computed a higher priority score than an article with a low degree of relevancy to the criteria for selecting the articles; and assigning articles from the plurality of articles to the plurality of information extractors based on the priority scores associated with the articles, such that articles with higher priority scores are assigned before articles with lower priority scores.

57. The method of claim 55 wherein receiving the criteria for selecting articles comprises receiving names of information sources and terms specific to a domain.

58. The method of claim 17 wherein identifying the plurality of articles from which information is to be extracted comprises:

storing access information for the plurality of articles in the database, wherein the access information enables the plurality of information extractors to access the plurality of articles.

59. The method of claim 58 wherein storing the access information for the plurality of articles comprises:

determining a first set of articles from the plurality of articles which are available in electronic format;

storing electronic copies of the articles in the first set in the database;

determining a second set of articles from the plurality of articles which are not available in electronic format;

scanning paper copies of the articles in the second set to generate electronic versions of the articles in the second set; and storing the electronic versions of the articles in the second set in the database.

60. The method of claim 58 wherein storing the access information for the plurality of articles comprises:

determining uniform resource locator (URL) information for at least one article from the plurality of articles; and storing the URL information for the at least one article in the database.

61. The method of claim 17 wherein identifying the plurality of information extractors comprises:

receiving information related to a plurality of candidates;

determining a first set of candidates from the plurality of candidates who have completed online certification;

determining a second set of candidates from the first set of candidates who have passed testing procedures; and designating the second set of candidates as the plurality of information extractors.

62. The method of claim 17 wherein receiving the information extracted by the first information extractor from the first article comprises:

providing a user interface; and receiving the information extracted from the first article via the user interface.

63. The method of claim 17 further comprising:

determining if the errors associated with the information extracted from the first article by the first information extractor have been corrected; and if the errors have been corrected:
calculating a quality score for the first article based upon the error count; and
storing the quality score in the database.

64. The method of claim 63 further comprising:

if the errors have been corrected:
determining a compensation amount to be paid to the first information extractor for extracting information from the first article; and
storing the compensation amount in the database.

65. The method of claim 64 wherein determining the compensation amount to be paid to the first information extractor comprises:

calculating the compensation amount based upon the error count and the quality score for the first article.

66. The method of claim 17 wherein the information store is configured to store the extracted information according to an information model, the method further comprising:

before storing the extracted information for the first article in the information store, enabling model reviewers to make changes to the information model based on the information extracted by the first information extractor from the first article.

67. The method of claim 17 wherein the information store is a knowledge base configured to store the extracted information according to an ontology, the method further comprising:

before storing the extracted information into the knowledge base:
receiving concept information identifying a concept associated with the extracted information received from the first information extractor for the first article;
enabling a first reviewer to review the concept information; and
receiving information from the first reviewer identifying changes to be made to the ontology.

68. The method of claim 67 further comprising:

enabling a second reviewer to review the information received from the first reviewer; and making changes to the ontology based on the information received from the first reviewer after the second reviewer approves of the information received from the first reviewer.

* * * * *